(12) United States Patent
Nakashima et al.

(10) Patent No.: US 12,712,470 B2
(45) Date of Patent: Aug. 18, 2026

(54) POWER CONVERSION DEVICE AND AIRCRAFT

(71) Applicant: Mitsubishi Electric Corporation, Tokyo (JP)

(72) Inventors: Junichi Nakashima, Tokyo (JP); Kenji Fujiwara, Tokyo (JP); Takayoshi Nagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 230 days.

(21) Appl. No.: 18/726,492

(22) PCT Filed: Jan. 19, 2022

(86) PCT No.: PCT/JP2022/001820
§ 371 (c)(1),
(2) Date: Jul. 3, 2024

(87) PCT Pub. No.: WO2023/139699
PCT Pub. Date: Jul. 27, 2023

(65) Prior Publication Data
US 2025/0080011 A1 Mar. 6, 2025

(51) Int. Cl.
*H02M 1/32* (2007.01)
*B60L 50/13* (2019.01)
*B60L 50/51* (2019.01)
*H02M 1/10* (2006.01)
*H02M 1/14* (2006.01)
*H02M 3/158* (2006.01)
(Continued)

(52) U.S. Cl.
CPC ........... *H02M 7/5387* (2013.01); *B60L 50/13* (2019.02); *B60L 50/51* (2019.02); *H02M 1/10* (2013.01);
(Continued)

(58) Field of Classification Search
CPC .... H02M 1/0003; H02M 1/008; H02M 1/088; H02M 1/10; H02M 1/14; H02M 1/32;
(Continued)

(56) References Cited

U.S. PATENT DOCUMENTS 8,125,797 B2 * 2/2012 Summer ................ H02M 3/28 363/21.01
10,075,114 B2 * 9/2018 Schnetzka .............. H02P 9/007
(Continued)

FOREIGN PATENT DOCUMENTS

EP 3723270 A1 * 10/2020 .............. H02P 27/08
JP 2017174283 A * 9/2017 ........... H02M 3/158
(Continued)

OTHER PUBLICATIONS

Junichi Nakashima; Takeshi Horiguchi; Yasushige Mukunoki; Kenji Hatori; Ryo Tsuda; Hitoshi Uemura; “Investigation of Full SiC Power Modules for More Electric Aircraft with Focus on FIT Rate and High Frequency Switching”; Jul. 13, 2021; IEEE; 2021 IEEE 12th Energy Conversion Congress; pp. 1599-1606 (Year: 2021).*
(Continued)

*Primary Examiner* — Thienvu V Tran
*Assistant Examiner* — Shahzeb K Ahmad
(74) *Attorney, Agent, or Firm* — XSENSUS LLP

(57) ABSTRACT

A power conversion device includes a first power converter, at least one second power converter and a control device. The first power converter is connected between a power source and a load. The at least one second power converter is connected in parallel with the first power converter between the power source and the load. The control device causes the first power converter and the at least one second power converter to perform parallel operation. The control device is configured to cause the at least one second power converter to operate alone when the first power converter fails. During the parallel operation, the at least one second power converter has a failure rate attributable to neutrons lower than the first power converter.

19 Claims, 43 Drawing Sheets

(51) Int. Cl.
*H02M 5/458* (2006.01)
*H02M 7/493* (2007.01)
*H02M 7/5387* (2007.01)

(52) U.S. Cl.
CPC ............. *H02M 1/14* (2013.01); *H02M 1/325* (2021.05); *H02M 3/158* (2013.01); *H02M 5/458* (2013.01); *H02M 7/493* (2013.01); *H02M 7/53871* (2013.01); *B60L 2200/10* (2013.01); *B60L 2210/10* (2013.01); *B60L 2210/20* (2013.01); *B60L 2210/42* (2013.01); *B60L 2220/42* (2013.01)

(58) Field of Classification Search
CPC .......... H02M 1/325; H02M 1/36; H02M 1/38; H02M 7/48; H02M 7/493; H02M 7/538; H02M 7/5387; H02M 7/53871; H02M 3/158; H02M 3/335; H02M 5/458; B60L 2210/10; B60L 2210/20; B60L 2210/42; B60L 50/51; B60L 50/13; B60L 2220/42; B60L 2200/10
See application file for complete search history.

(56) References Cited

U.S. PATENT DOCUMENTS

| | | | | |
|---|---|---|---|---|
| 2014/0197681 | A1* | 7/2014 | Iwashima | B60L 53/53 307/9.1 |
| 2016/0261205 | A1* | 9/2016 | Kolar | H02M 5/458 |
| 2019/0199086 | A1* | 6/2019 | Li | H02H 7/08 |
| 2023/0216431 | A1 | 7/2023 | Shirouchi et al. | |
| 2024/0266969 | A1* | 8/2024 | Kamizuma | H02M 7/217 |

FOREIGN PATENT DOCUMENTS

| | | | |
|---|---|---|---|
| JP | 2019-077361 | A | 5/2019 |
| JP | 6877660 | B1 | 5/2021 |

OTHER PUBLICATIONS

International Search Report and Written Opinion mailed on Mar. 22, 2022 received for PCT Application PCT/JP2022/001820, filed on Jan. 19, 2022, 8 pages including English Translation.

* cited by examiner

10000
CONTROL DEVICE
2000
2001
1001
GENERATOR
AC/DC
DC/DC
DC/AC
MOTOR
1003
1004
1008
1007
1000

10000
CONTROL DEVICE
5000
3p
d
1m
1a
1d
g
s
7
2
5p
d
1m
1b
8
1d
Vout
g
s
3n
5n

FIG.8

5000c
CONTROL DEVICE
10000
Vout
5p
5n
3p
3n
7
8
2
6
1
1d
1m
d
s
g

29 t0
t1
t2
t3
t4
t5
NEUTRON
RATIO
[-]
200
100
0
49
100
10
FIT
1
0.1
0.01
54
56
APPLIED
VOLTAGE
[V]
Va
Vb
50
55
TIME

2000
GENERATOR
AC/DC
1003
1004
2001
DC/DC
DC/AC
1008
1007
1001
MOTOR
62
ALTIMETER
61
GPS
10000
63
COMPUTER
CONTROL UNIT
63
65
2002
DC/DC
DC/AC
1008b
1009
1002a
ELECTRICAL COMPONENT
2003
DC/DC
DC/DC
1008c
1010
1002b
ELECTRICAL COMPONENT
2004
DC/DC
1010
1002b
ELECTRICAL COMPONENT

1002a
ELECTRICAL COMPONENT
2002b
CB
3000
DC/AC
1009
CB
3000
TR1
DC/DC
TR2
1008b
CB
3000b
DC/AC
1009b
CB
3000b
2000
AC/DC
1004
GENERATOR
1003
10000
CONTROL UNIT
65
COMPUTER
63
GPS
61
ALTIMETER
62

1002b
ELECTRICAL COMPONENT
2003b
CB
3000
DC/DC
1010
CB
3000
TR1
DC/DC
TR2
1008c
CB
3000b
DC/DC
1010b
CB
3000b
2000
AC/DC
1004
GENERATOR
1003
10000
CONTROL UNIT
65
COMPUTER
63
GPS
61
ALTIMETER
62

ELECTRICAL COMPONENT
1002b
2004b
CB
3000
DC/DC
1010
CB
3000
CB
3000b
DC/DC
1010b
CB
3000b
2000
AC/DC
1004
AC/DC
1004b
GENERATOR
1003
10000
CONTROL UNIT
65
COMPUTER
63
GPS
61
ALTIMETER
62

POWER CONVERSION DEVICE AND AIRCRAFT

CROSS-REFERENCE TO RELATED APPLICATION

This application is a national stage application, pursuant to 35 U.S.C. § 371, of International Patent Application No. PCT/JP2022/001820, filed Jan. 19, 2022, the entire contents of which are incorporated herein by reference.

TECHNICAL FIELD

The present disclosure relates to a power conversion device and an aircraft.

BACKGROUND ART

Japanese Patent Laying-Open No. 2019-77361 (PTL 1) discloses an aircraft that obtains a propulsive force by rotation of a propeller connected to an electric motor. In PTL 1, a redundant configuration is applied to an inverter that supplies a power to an electric motor. Specifically, two inverters are connected in parallel to the electric motor via a switch circuit. In a case where a first inverter fails, an operation of the electric motor is continued by switching the inverter that supplies a power to the electric motor to a spare second inverter by the switch circuit.

U.S. Pat. No. 6,877,660 (PTL 2) describes an accidental failure of a semiconductor element attributable to neutrons as one of causes of failures of a power conversion device mounted on an aircraft. A failure rate of the semiconductor element attributable to the neutrons is correlated with a type of the semiconductor element and a voltage applied to the semiconductor element. In PTL 2, in the power conversion device including a plurality of semiconductor elements, failure rates of the plurality of semiconductor elements are made equal by adjusting voltages applied to the semiconductor elements, withstand voltages of the semiconductor elements, or types of the semiconductor elements.

CITATION LIST

Patent Literature

PTL 1: Japanese Patent Laying-Open No. 2019-77361
PTL 2: U.S. Pat. No. 6,877,660

SUMMARY OF INVENTION

Technical Problem

In a configuration of PTL 1, even if the first inverter fails, the power can be continuously supplied to the electric motor by the spare second inverter. However, since failure rates of the first inverter and the second inverter attributable to the neutrons are not taken into consideration, in a case where the failure rates attributable to the neutrons are equal in the first inverter and the second inverter, the second inverter is required to be continuously operated with the same failure rate as that of the first inverter even after the first inverter fails. In this case, there is a concern that the second inverter may fail following the first inverter.

In a configuration of PTL 2, although the power conversion device does not have the redundant configuration, the failure rates of the plurality of semiconductor elements can be lowered by reducing the voltages applied to the semiconductor elements as the aircraft ascends the height. However, since the voltage to be supplied from the power conversion device to the electric motor is also reduced by lowering an applied voltage to the semiconductor elements, a torque that can be output by the electric motor is also lowered. As a result, there is a concern that the propulsive force necessary for the aircraft to ascend the height may not be obtained.

The present disclosure has been made to solve such problem, and the present disclosure aims to improve reliability of the power conversion device having the redundant configuration against the failures attributable to the neutrons.

Solution to Problem

According to one aspect of the present disclosure, a power conversion device that converts a DC power from a power source into a power to be supplied to a load includes a first power converter, at least one second power converter, and a control device. The first power converter is connected between the power source and the load. The at least one second power converter is connected in parallel with the first power converter between the power source and the load. The control device causes the first power converter and the at least one second power converter to operate in parallel. The control device is configured to cause the at least one second power converter to operate alone when the first power converter fails. During the parallel operation, the at least one second power converter has a failure rate attributable to the neutrons lower than the first power converter.

ADVANTAGEOUS EFFECTS OF INVENTION

According to the present disclosure, it is possible to improve the reliability of the power conversion device having the redundant configuration against the failures attributable to the neutrons.

BRIEF DESCRIPTION OF DRAWINGS

FIG. 8 is a diagram illustrating a configuration example of a first semiconductor element.

FIG. 13 is a diagram illustrating a configuration example of a second semiconductor element.

DESCRIPTION OF EMBODIMENTS

Figure 1:
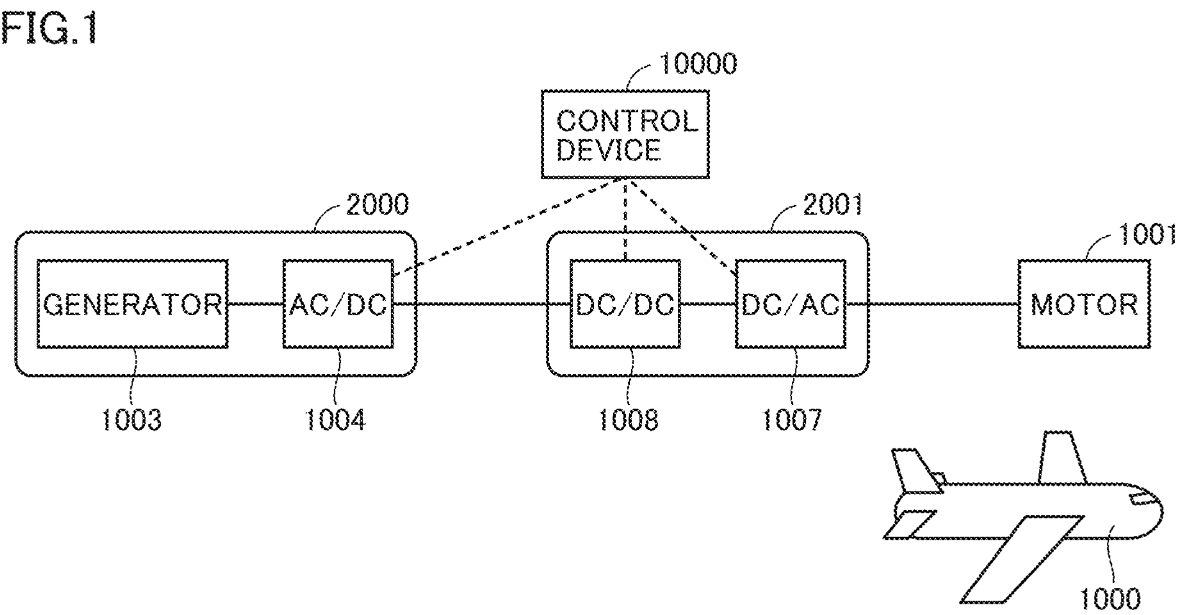
FIG. 1 is a schematic configuration diagram illustrating a first configuration example of a power system of an aircraft.

Hereinafter, embodiments of the present disclosure will be described in detail with reference to the drawings. Note that the same or corresponding parts in the drawings are denoted by the same reference signs, and the description thereof will not be repeated.

First Embodiment

<Configuration Example of Power System of Aircraft>

First, the configuration example of the power system of the aircraft to which the power conversion device according to the first embodiment of the present disclosure is applied will be described with reference to FIGS. 1 to 6.

First Configuration Example

FIG. 1 is a schematic configuration diagram illustrating a first configuration example of a power system of an aircraft. The aircraft is, for example, a manned or unmanned airplane, a helicopter, a drone, or the like. In the following description, the airplane is exemplified as an aircraft 1000.

As illustrated in FIG. 1, the first configuration example of the power system includes a power source 2000, a propulsion system 2001, a propulsion system motor 1001, and a control device 10000.

Power source 2000 generates a DC voltage. Specifically, power source 2000 includes a generator 1003 and an AC/DC converter 1004. Generator 1003 generates an AC voltage. AC/DC converter 1004 converts the AC voltage generated by generator 1003 into a DC voltage. AC/DC converter 1004 supplies the generated DC voltage to propulsion system 2001.

Propulsion system 2001 supplies a power generated by power source 2000 to propulsion system motor 1001. Specifically, propulsion system 2001 includes a DC/DC converter 1008 and a DC/AC converter 1007. DC/DC converter 1008 performs voltage transformation on the DC voltage to be supplied from power source 2000. DC/DC converter 1008 is configured to control an input voltage to DC/AC converter 1007. DC/AC converter 1007 converts the transformed DC voltage into an AC voltage, and supplies the converted AC voltage to propulsion system motor 1001.

Control device 10000 controls power conversion operations in AC/DC converter 1004, DC/DC converter 1008, and DC/AC converter 1007. Control device 10000 is input with sensor information indicating detection values of various sensors disposed in AC/DC converter 1004, DC/DC converter 1008, and DC/AC converter 1007. The sensor information includes detection values of a current, a voltage, and a temperature of the each of the power converters, abnormality detection signals, and the like.

Note that although not illustrated, control device 10000 may further control generator 1003 and propulsion system motor 1001. In addition, a plurality of control devices 10000 may be disposed in the power system, and the plurality of control devices 10000 may be configured to control power source 2000, propulsion system 2001, and propulsion system motor 1001, respectively, by exchanging the signals with each other.

Second Configuration Example

Figure 2:
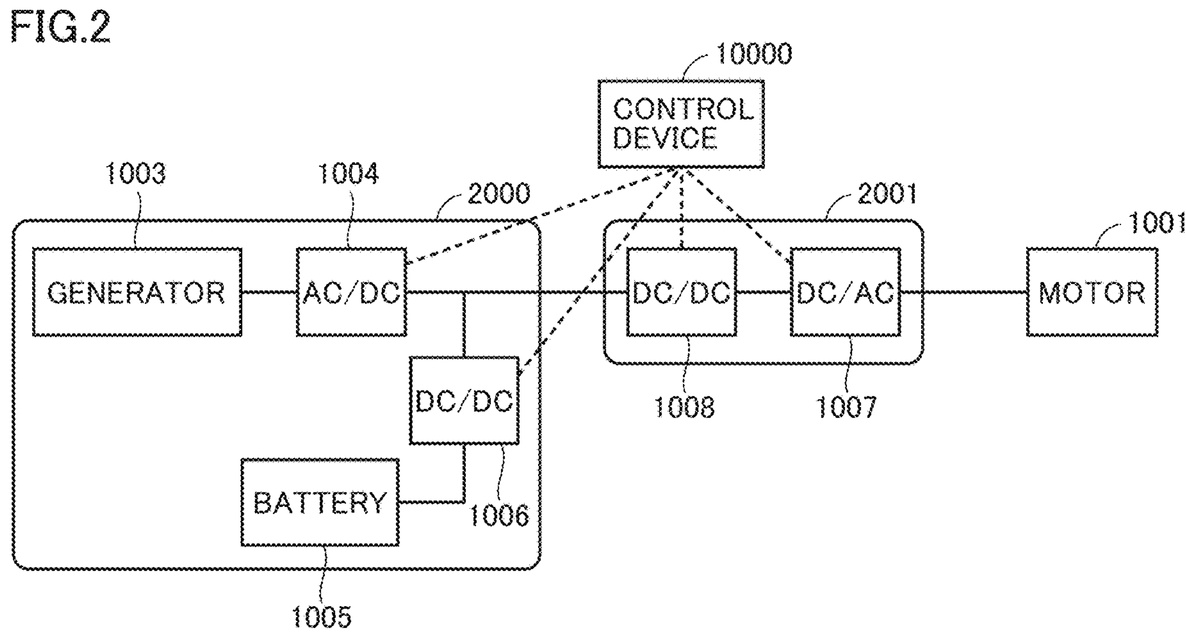
FIG. 2 is a schematic configuration diagram illustrating a second configuration example of the power system of the aircraft.

FIG. 2 is a schematic configuration diagram illustrating a second configuration example of the power system of the aircraft. The second configuration example of the power system has the same basic configuration as the first configuration example illustrated in FIG. 1, but a configuration of power source 2000 is different.

As illustrated in FIG. 2, in the second configuration example, power source 2000 further includes a battery 1005 and a DC/DC converter 1006 in addition to generator 1003 and AC/DC converter 1004. DC/DC converter 1006 performs the voltage transformation on a DC voltage of battery 1005 and supplies the transformed voltage to propulsion system 2001. In other words, power source 2000 is configured to generate a DC voltage from a power generated by generator 1003 and a power of battery 1005. Note that illustration of battery 1005 and DC/DC converter 1006 is omitted in configuration examples of FIG. 3 and subsequent drawings.

Third Configuration Example

Figure 3:
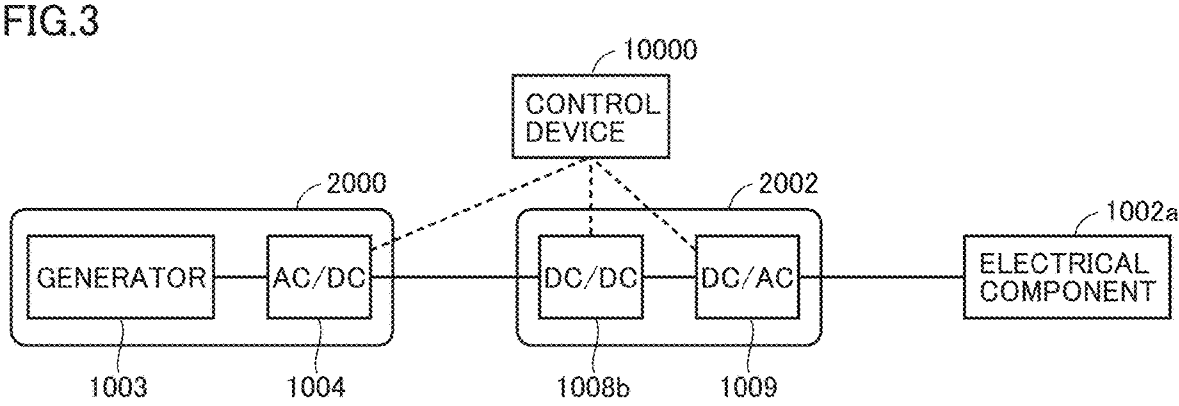
FIG. 3 is a schematic configuration diagram illustrating a third configuration example of the power system of the aircraft.

FIG. 3 is a schematic configuration diagram illustrating a third configuration example of the power system of the aircraft. The third configuration example of the power system is different from the first configuration example illustrated in FIG. 1 in including an electrical component system 2002 and an electrical component 1002*a* instead of propulsion system 2001 and propulsion system motor 1001.

As illustrated in FIG. 3, electrical component system 2002 supplies the power generated by power source 2000 to electrical component 1002*a*. Electrical component 1002*a* is, for example, an electrical component driven by the AC voltage among electrical components such as a pump, an actuator, a lighting equipment, a display, and a control panel.

Specifically, electrical component system 2002 includes a DC/DC converter 1008*b* and a DC/AC converter 1009. DC/DC converter 1008*b* performs the voltage transformation on the DC voltage to be supplied from power source 2000. DC/DC converter 1008*b* is configured to control an input voltage to DC/AC converter 1009. DC/AC converter 1009 converts the transformed DC voltage into an AC voltage, and supplies the converted AC voltage to electrical component 1002*a*. Electrical component 1002*a* is driven by an AC voltage to be supplied from electrical component system 2002.

Fourth Configuration Example

Figure 4:
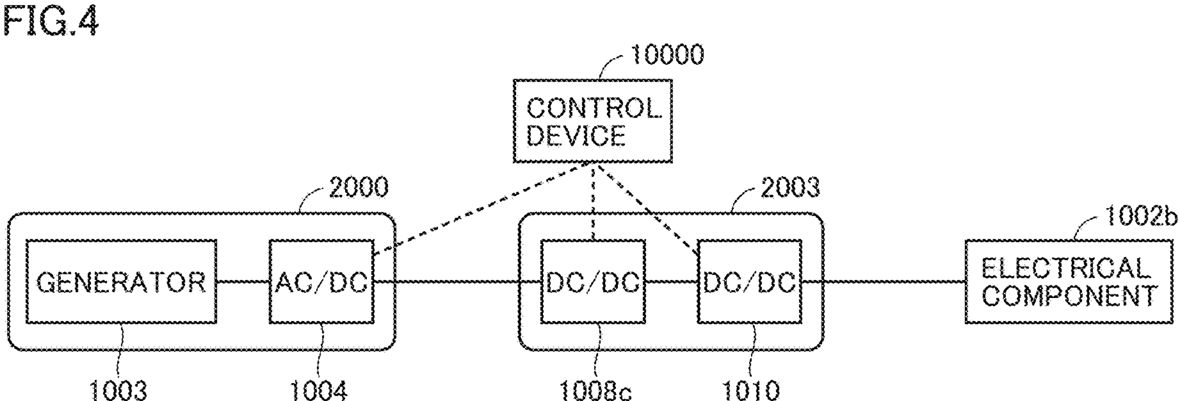
FIG. 4 is a schematic configuration diagram illustrating a fourth configuration example of the power system of the aircraft.

FIG. 4 is a schematic configuration diagram illustrating a fourth configuration example of the power system of the aircraft. The fourth configuration example of the power system is different from the first configuration example illustrated in FIG. 1 in including an electrical component system 2003 and an electrical component 1002*b* instead of propulsion system 2001 and motor 1001.

As illustrated in FIG. 4, electrical component system 2003 supplies the power generated by power source 2000 to electrical component 1002*b*. Electrical component 1002*b* is an electrical component driven by the DC voltage among the electrical components.

Specifically, electrical component system 2003 includes a DC/DC converter 1008*c* and a DC/DC converter 1010. DC/DC converter 1008*c* performs the voltage transformation on the DC voltage to be supplied from power source 2000. DC/DC converter 1008*c* is configured to control an input voltage to DC/DC converter 1010. DC/DC converter 1010 performs the voltage transformation on the transformed DC voltage and supplies the transformed voltage to electrical component 1002*b*. Electrical component 1002*b* is driven by a DC voltage to be supplied from electrical component system 2003.

Fifth Configuration Example

Figure 5:
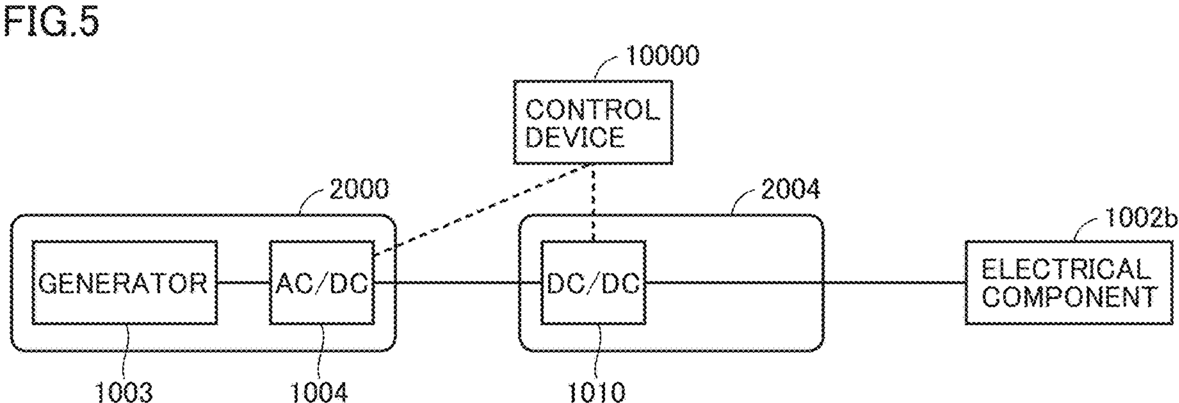
FIG. 5 is a schematic configuration diagram illustrating a fifth configuration example of the power system of the aircraft.

FIG. 5 is a schematic configuration diagram illustrating a fifth configuration example of the power system of the aircraft. The fifth configuration example of the power system is different from the first configuration example illustrated in FIG. 1 in including an electrical component system 2004 and an electrical component 1002*b* instead of propulsion system 2001 and motor 1001.

As illustrated in FIG. 5, electrical component system 2004 supplies the power generated by power source 2000 to electrical component 1002*b*. Electrical component 1002*b* is an electrical component driven by the DC voltage among the electrical components.

Specifically, electrical component system 2004 includes DC/DC converter 1010. DC/DC converter 1010 performs the voltage transformation on the DC voltage to be supplied from power source 2000 and supplies the voltage to electrical component 1002*b*. Electrical component 1002*b* is driven by a DC voltage to be supplied from electrical component system 2004.

Sixth Configuration Example

Figure 6:
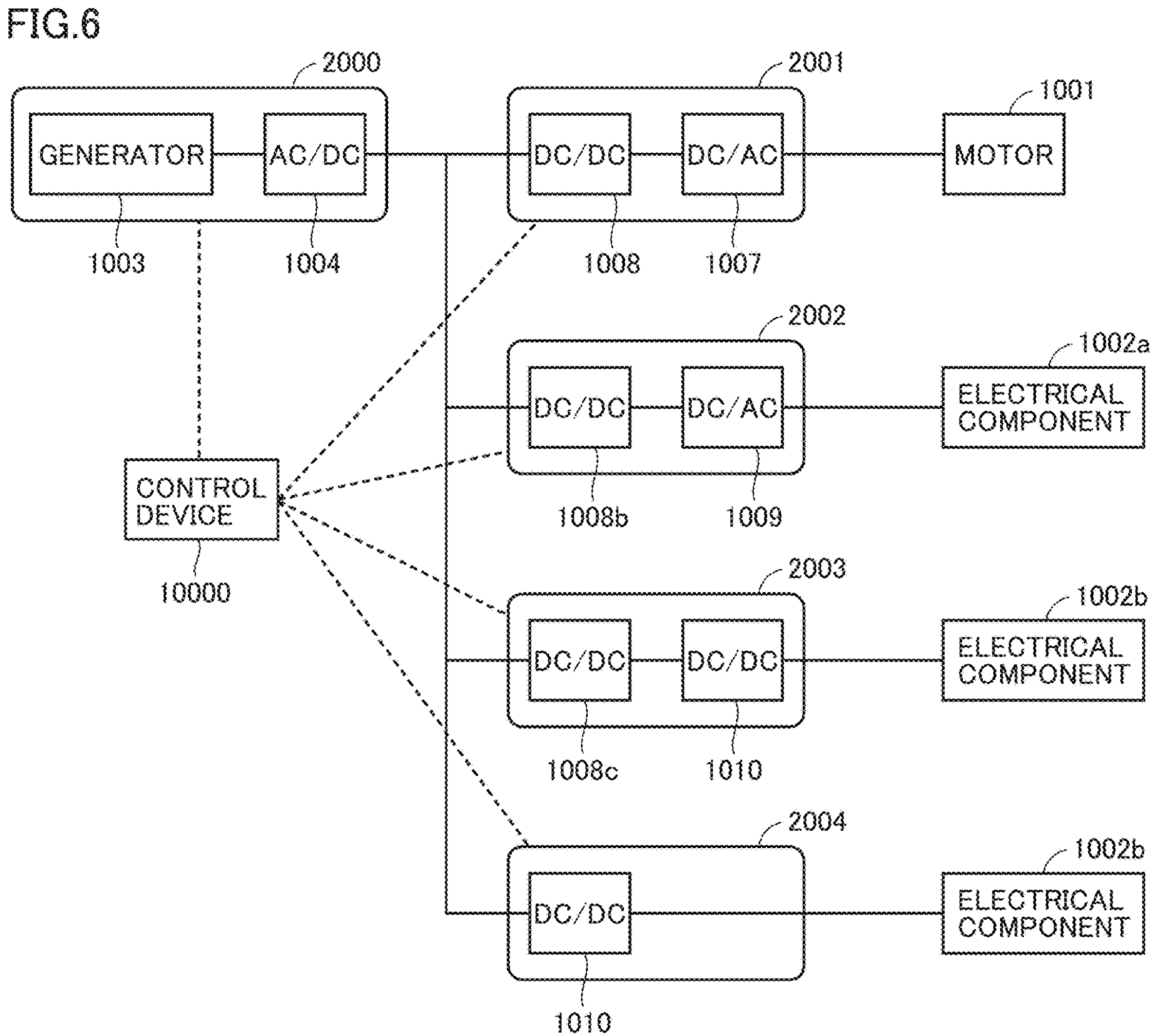
FIG. 6 is a schematic configuration diagram illustrating a sixth configuration example of the power system of the aircraft.

FIG. 6 is a schematic configuration diagram illustrating a sixth configuration example of the power system of the aircraft. The sixth configuration example of the power system further includes electrical component systems 2002 to 2004, and electrical components 1002*a* and 1002*b* added to the first configuration example illustrated in FIG. 1. Since electrical component systems 2002 to 2004, and electrical components 1002*a* and 1002*b* are the same as those illustrated in FIGS. 3 to 5, the description thereof will be omitted.

In a combined system illustrated in FIG. 6, power source 2000 is shared as a power supply source to propulsion system 2001 and electrical component systems 2002 to 2004. Propulsion system 2001, and electrical component systems 2002 to 2004 convert the DC voltage to be supplied from power source 2000 into a voltage for driving a corresponding load (propulsion system motor 1001, or electrical components 1002*a* and 1002*b*) and supply the voltage to the load.

Note that aircraft 1000 does not include all systems 2001 to 2004, and at least one of systems 2001 to 2004 illustrated in FIG. 6 can be appropriately selected depending on the load carried by aircraft 1000. In addition, a battery may be further connected to a DC bus that connects the power converters. In addition, a circuit breaker (CB) not illustrated is arranged in each of the systems and between the systems.

<Configuration Example of DC/DC Converter>

Next, a circuit configuration example of a DC/DC converter included in the power system described above will be described with reference to FIGS. 7 to 11. Hereinafter, DC/DC converter 1008 of propulsion system 2001 will be described as an example.

Figure 7:
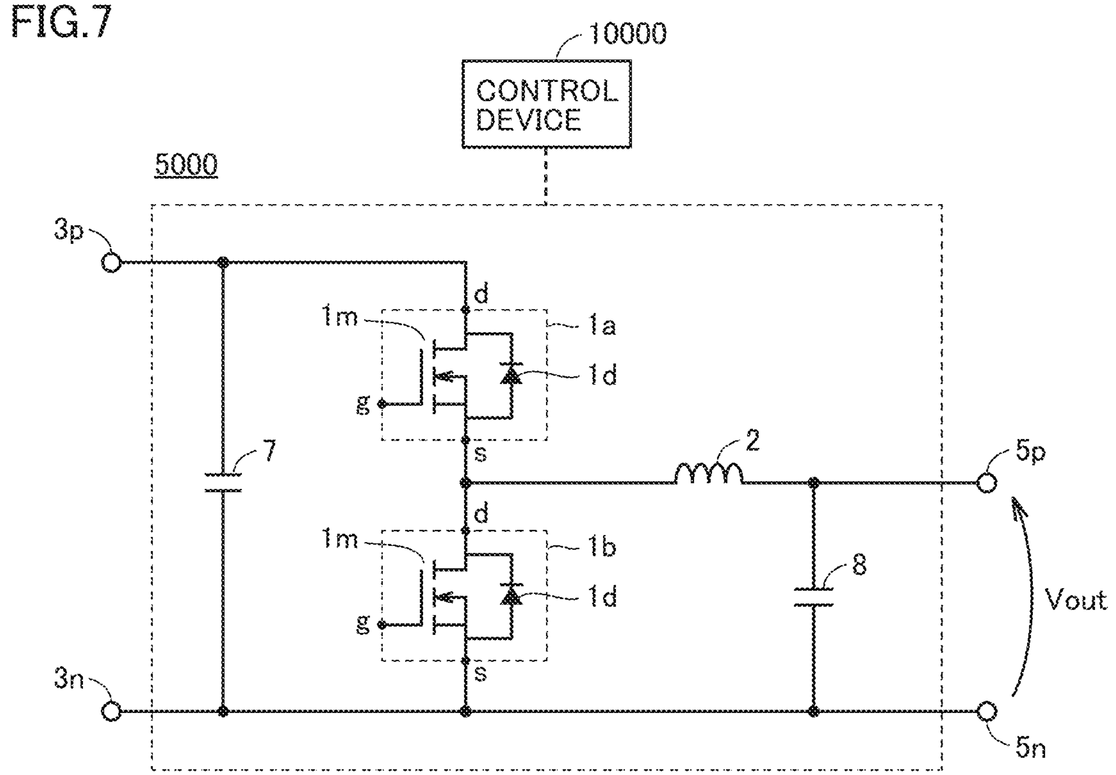
FIG. 7 is a diagram illustrating a first circuit configuration example of a DC/DC converter.

FIG. 7 is a diagram illustrating a first circuit configuration example of DC/DC converter 1008. As illustrated in FIG. 7, DC/DC converter 1008 includes a non-insulated step-down chopper circuit 5000. Non-insulated step-down chopper circuit 5000 steps down a DC voltage input from an input positive bus 3*p* and an input negative bus 3*n*, and outputs the stepped-down DC voltage as an output voltage Vout to an output positive bus 5*p* and an output negative bus 5*n*.

Non-insulated step-down chopper circuit 5000 includes first semiconductor elements 1*a* and 1*b* as switching elements, a reactor 2, and smoothing capacitors 7 and 8.

First semiconductor elements 1*a* and 1*b* are connected in series between input positive bus 3*p* and input negative bus 3*n*. First semiconductor element 1*a* constitutes an upper arm, and first semiconductor element 1*b* constitutes a lower arm. First semiconductor elements 1*a* and 1*b* are collectively referred to as "first semiconductor element 1".

Reactor 2 is connected between a connection node of first semiconductor element 1*a* with first semiconductor element 1*b* and output positive bus 5*p*. Smoothing capacitor 7 is connected between input positive bus 3*p* and input negative bus 3*n*. Smoothing capacitor 8 is connected between output positive bus 5*p* and output positive bus 5*n*. Each of smoothing capacitors 7 and 8 smooths the DC voltage including a ripple voltage.

In non-insulated step-down chopper circuit 5000, step-down control on the input voltage is ideally executed by adjusting an impedance of reactor 2 and a switching duty ratio (a ratio between an on-period and an off-period) of first semiconductor element 1*a* (the upper arm). However, output voltage Vout may fluctuate due to influences of impedances of a wire, first semiconductor element 1, and the like, and a power converter, a load, or the like connected between output positive bus 5*p* and output negative bus 5*n*. Therefore, output voltage Vout, a current flowing through reactor 2, an inter-terminal voltage and a temperature of first semiconductor element 1, and the like are detected by a sensor (not illustrated), and detection values thereof are provided to control device 10000 as sensor information. Control device 10000 causes the sensor information to be fed back to control of a switching operation of first semiconductor element 1*a*.

Figure 8:
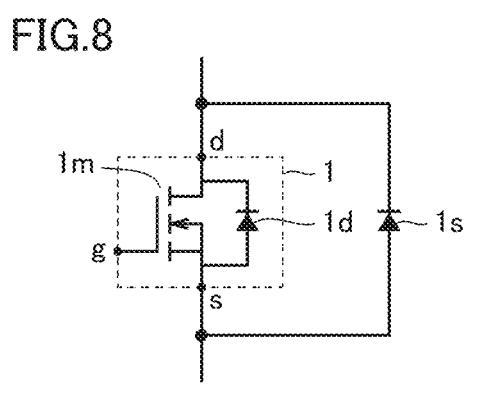

FIG. 8 is a diagram illustrating a configuration example of first semiconductor element 1 included in DC/DC converter 1008 illustrated in FIG. 7. As illustrated in FIG. 8, first semiconductor element 1 includes a metal oxide semiconductor field effect transistor (MOSFET) 1*m* as the switching element and a diode 1*d*. Diode 1*d* is a freewheeling diode (FWD), and is connected in anti-parallel with the switching element. In a case where the switching element is the MOSFET, diode 1*d* can include a parasitic diode (a body diode) of the MOSFET.

In a case where a large current flows through each of the arms of non-insulated step-down chopper circuit 5000, it is common to connect the plurality of first semiconductor elements 1 in parallel to configure the each of the arms and divide the current. In addition, even in a case where the large current does not flow through the each of the arms, the plurality of first semiconductor elements 1 may be connected in parallel to reduce conduction loss of first semiconductor elements 1.

Note that since the MOSFET has the parasitic diode, it is not necessary to separately connect the freewheeling diode to the MOSFET in anti-parallel. However, as illustrated in FIG. 8, a diode 1*s* may be connected to first semiconductor element 1 in anti-parallel. In addition, diode 1*s* may be one or more.

In a case where non-insulated step-down chopper circuit 5000 does not perform a bidirectional voltage conversion operation, first semiconductor element 1*b* (the lower arm) performs only rectification, and thus a switching function becomes unnecessary. Therefore, first semiconductor element 1*b* may include only the diode.

As described above, in a case where the plurality of first semiconductor elements 1 are connected in parallel to constitute the each of the arms, non-insulated step-down chopper circuit 5000 may be configured by using a power semiconductor module on which the plurality of first semiconductor elements 1 are mounted in one package.

Figure 9:
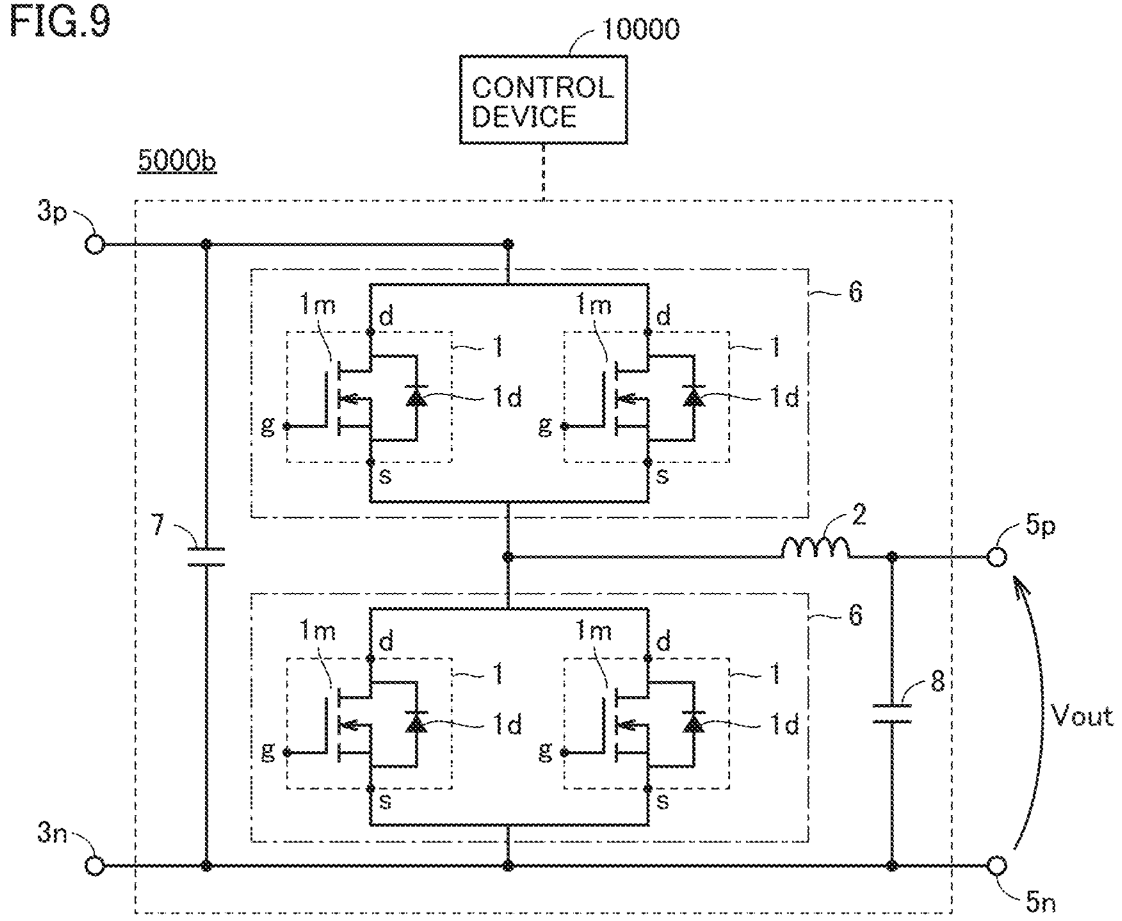
FIG. 9 is a diagram illustrating a second circuit configuration example of the DC/DC converter.

FIG. 9 is a diagram illustrating a second circuit configuration example of DC/DC converter 1008. As illustrated in FIG. 9, DC/DC converter 1008 includes a non-insulated step-down chopper circuit 5000*b*. Non-insulated step-down chopper circuit 5000*b* is different from non-insulated step-down chopper circuit 5000 illustrated in FIG. 7 in that each of the upper arm and the lower arm includes the plurality of first semiconductor elements 1 connected in parallel.

In the example of FIG. 9, the each of the upper arm and the lower arm includes a first power semiconductor module 6 having two first semiconductor elements 1 connected in parallel. Note that the number of first semiconductor elements 1 included in first power semiconductor module 6 may be greater than or equal to three.

Figure 10:
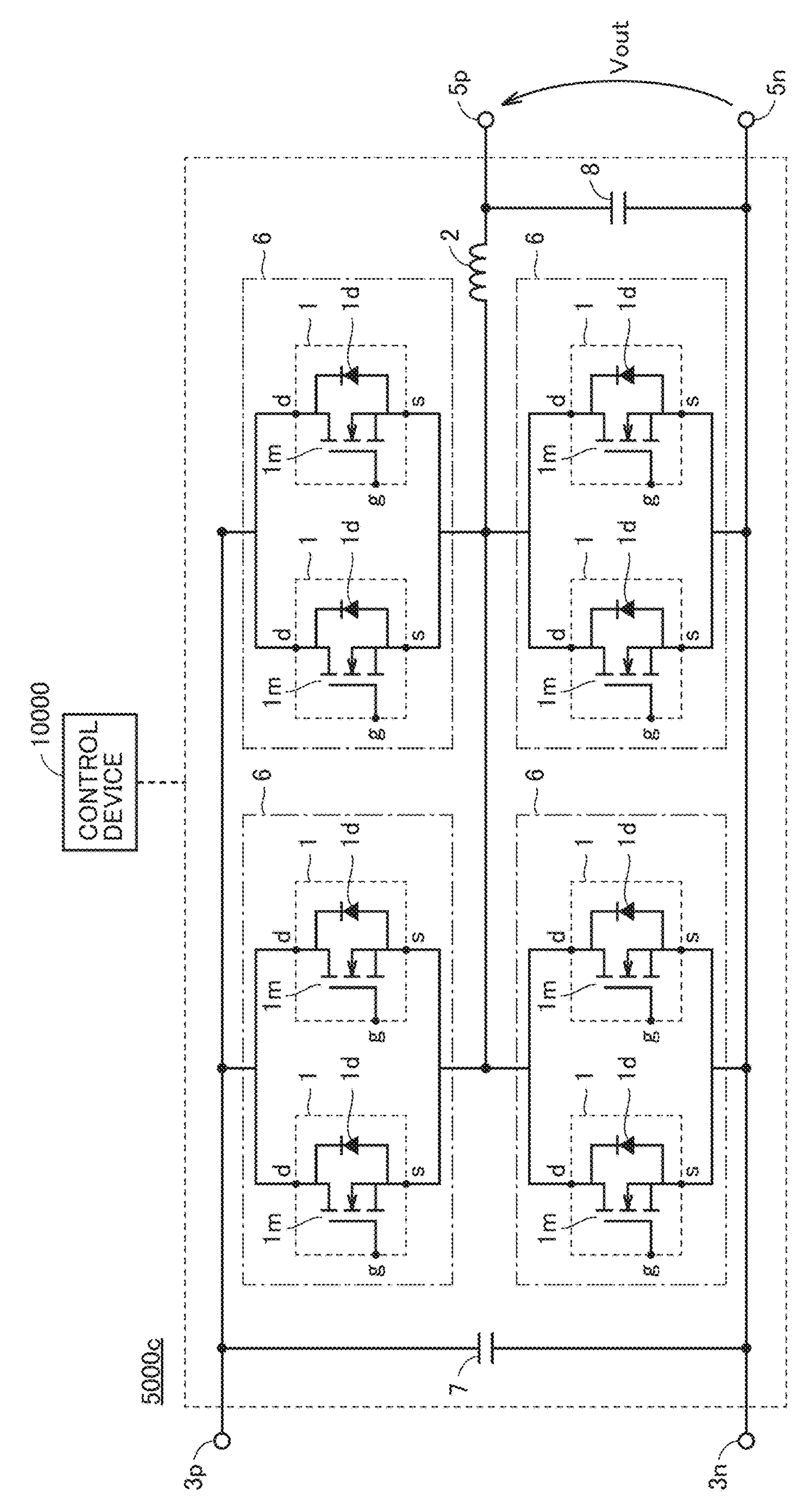
FIG. 10 is a diagram illustrating a third circuit configuration example of the DC/DC converter.

FIG. 10 is a diagram illustrating a third circuit configuration example of DC/DC converter 1008. As illustrated in FIG. 10, DC/DC converter 1008 includes a non-insulated step-down chopper circuit 5000*c*. Non-insulated step-down chopper circuit 5000*c* is different from non-insulated step-down chopper circuit 5000 illustrated in FIG. 7 in that the each of the upper arm and the lower arm includes a plurality of first power semiconductor modules 6 connected in parallel.

In the example of FIG. 10, the each of the upper arm and the lower arm includes two first power semiconductor modules 6 connected in parallel. Each of first power semiconductor modules 6 includes the two first semiconductor elements 1 connected in parallel. Note that both the number of first power semiconductor modules 6 included in the each of the arms and the number of first semiconductor elements 1 included in the each of first power semiconductor modules 6 may be greater than or equal to three.

Note that although FIGS. 7, 9, and 10 illustrate a circuit configuration example of a non-insulated step-down chopper circuit having a half bridge circuit, DC/DC conversion circuit 1008 may include a non-insulated chopper circuit having a full bridge circuit. In addition, in place of the non-insulated step-down chopper circuit, an isolated step-down chopper circuit using a transformer or a capacitor may be adopted.

In addition, in FIGS. 7, 9, and 10, the non-insulated step-down chopper circuit is exemplified as DC/DC conversion circuit 1008 being a step-down circuit. However, in a case where DC/DC conversion circuit 1008 is a step-up circuit, a non-insulated step-up chopper circuit as illustrated in FIG. 11 can be adopted.

Figure 11:
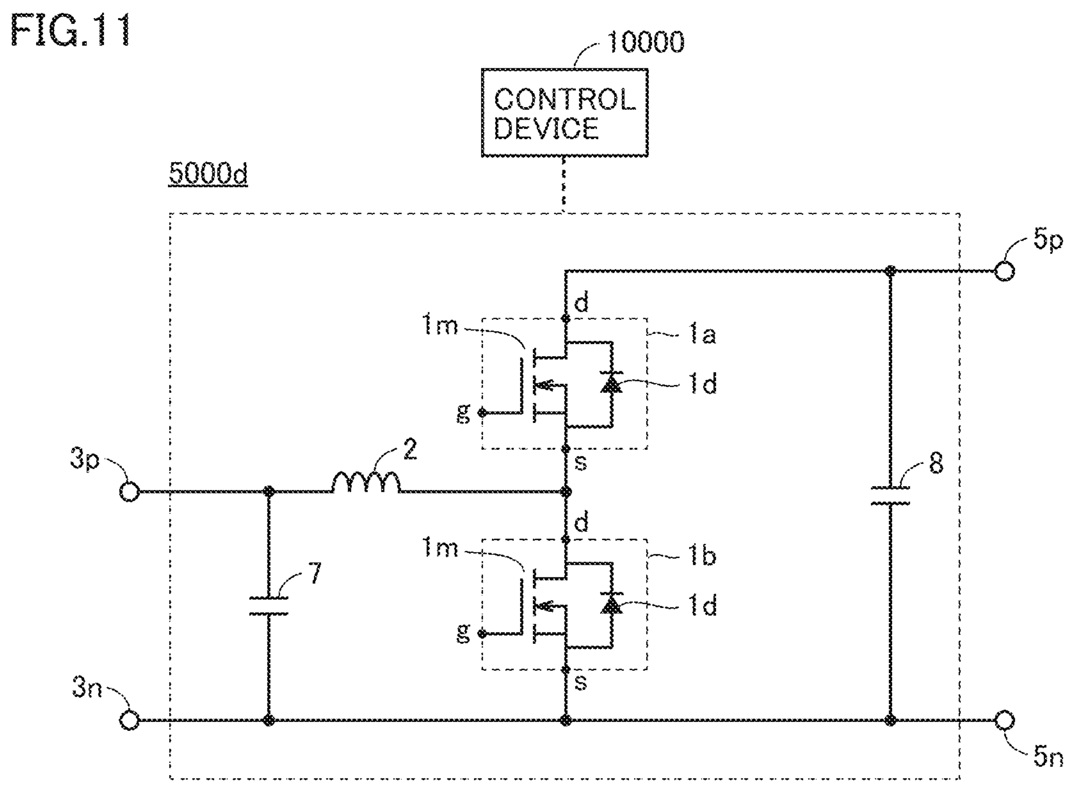
FIG. 11 is a diagram illustrating a fourth circuit configuration example of the DC/DC converter.

FIG. 11 is a diagram illustrating a fourth circuit configuration example of DC/DC converter 1008. As illustrated in FIG. 11, DC/DC converter 1008 includes a non-insulated step-up chopper circuit 5000*d*. Non-insulated step-up chopper circuit 5000*d* is different from non-insulated step-down chopper circuit 5000 illustrated in FIG. 7 in that reactor 2 is connected between input positive bus 3*p* and the connection node of first semiconductor element 1*a* with first semiconductor element 1*b*.

In non-insulated step-up chopper circuit 5000*d*, step-up control on the input voltage is ideally executed by adjusting the impedance of reactor 2 and a switching duty ratio of first semiconductor element 1*b* (the lower arm). However, since the output voltage fluctuates similarly to non-insulated step-down chopper circuit 5000, control device 10000 causes the sensor information to be fed back to control of a switching operation of first semiconductor element 1*b*.

<Configuration Example of DC/AC Converter>

Next, a circuit configuration example of a DC/AC converter included in the power system described above will be described with reference to FIGS. 12 to 15. Hereinafter, DC/AC converter 1007 of propulsion system 2001 will be described as an example.

Figure 12:
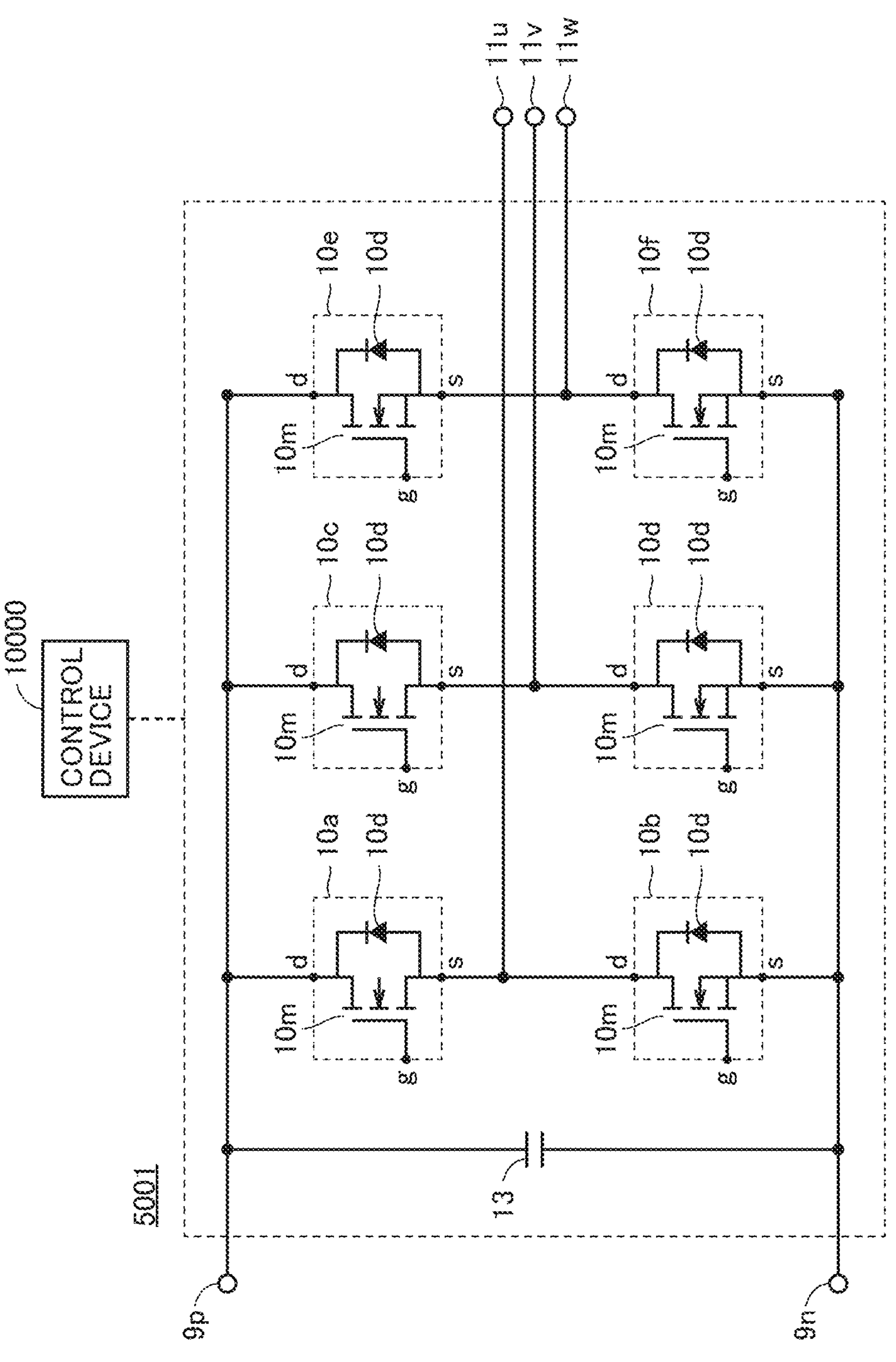
FIG. 12 is a diagram illustrating a first circuit configuration example of a DC/AC converter.

FIG. 12 is a diagram illustrating a first circuit configuration example of DC/AC converter 1007. As illustrated in FIG. 12, DC/AC converter 1007 includes a three-phase two-level inverter circuit 5001. Three-phase two-level inverter circuit 5001 converts DC voltages input from an input positive bus 9*p* and an input negative bus 9*n* into three-phase (U-phase, V-phase, W-phase) AC voltages, and outputs the three-phase AC voltages to AC output terminals 11*u*, 11*v*, and 11*w*.

Three-phase two-level inverter circuit 5001 includes second semiconductor elements 10*a* to 10*f* as switching elements and a smoothing capacitor 13.

Second semiconductor elements 10*a* and 10*b* are connected in series between input positive bus 9*p* and input negative bus 9*n*. A connection node of second semiconductor element 10*a* with second semiconductor element 10*b* is connected to U-phase output terminal 11*u*. Second semiconductor elements 10*c* and 10*d* are connected in series between input positive bus 9*p* and input negative bus 9*n*. A connection node of second semiconductor element 10*c* with second semiconductor element 10*d* is connected to V-phase output terminal 11*v*. Second semiconductor elements 10*e* and 10*f* are connected in series between input positive bus 9*p* and input negative bus 9*n*. A connection node of second semiconductor element 10*e* with second semiconductor element 10*f* is connected to W-phase output terminal 11*w*. Second semiconductor elements 10*a* and 10*b* constitute a U-phase leg, second semiconductor elements 10*c* and 10*d* constitute a V-phase leg, and second semiconductor elements 10*e* and 10*f* constitute a W-phase leg. Second semiconductor elements 10*a* to 10*f* are collectively referred to as "second semiconductor elements 10".

Smoothing capacitor 13 is connected between input positive bus 9*p* and input negative bus 9*n*, and smooths the DC voltage including the ripple voltage.

Three-phase two-level inverter circuit 5001 is equipped with a sensor for detecting a current flowing through U-phase output terminal 11*u*, V-phase output terminal 11*v*, and W-phase output terminal 11*w*, a voltage across U-phase output terminal 11*u*, V-phase output terminal 11*v*, and W-phase output terminal 11*w*, and an inter-terminal voltage and a temperature of each of second semiconductor elements 10. Detection values thereof from the sensor are given to control device 10000 as the sensor information. Control device 10000 causes the sensor information to be fed back to control of a switching operation of the each of second semiconductor elements 10.

Figure 13:
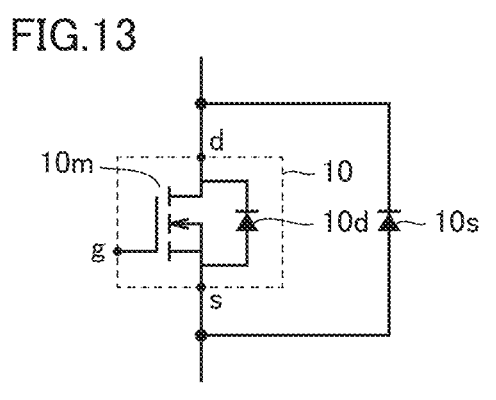

FIG. 13 is a diagram illustrating a configuration example of second semiconductor element 10 included in DC/AC converter 1007 illustrated in FIG. 12. As illustrated in FIG. 13, second semiconductor element 10 includes a MOSFET 10*m* as the switching element and a diode 10*d*. Diode 10*d* is the freewheeling diode and is connected in anti-parallel with the switching element. In the case where the switching element is the MOSFET, diode 10*d* can include the parasitic diode of the MOSFET.

In a case where a large current flows through the each of the arms of a respective leg of three-phase two-level inverter circuit 5001, it is common to connect a plurality of second semiconductor elements 10 in parallel to configure the each of the arms, and divide the current. In addition, even in the case where the large current does not flow through the each of the arms, the plurality of second semiconductor elements 10 may be connected in parallel to reduce conduction loss of second semiconductor elements 10.

Note that since the MOSFET has the parasitic diode, it is not necessary to separately connect the freewheeling diode to the MOSFET in anti-parallel. However, as illustrated in FIG. 13, a diode 10*s* may be connected to second semiconductor element 10 in anti-parallel. In addition, diode 10*s* may be one or more.

Similarly to non-insulated step-down chopper circuit 5000 described above, in a case where the plurality of second semiconductor elements 10 are connected in parallel to configure the each of the arms, three-phase two-level inverter circuit 5001 may be configured by using the power semiconductor module on which the plurality of second semiconductor elements 10 are mounted in one package.

Figure 14:
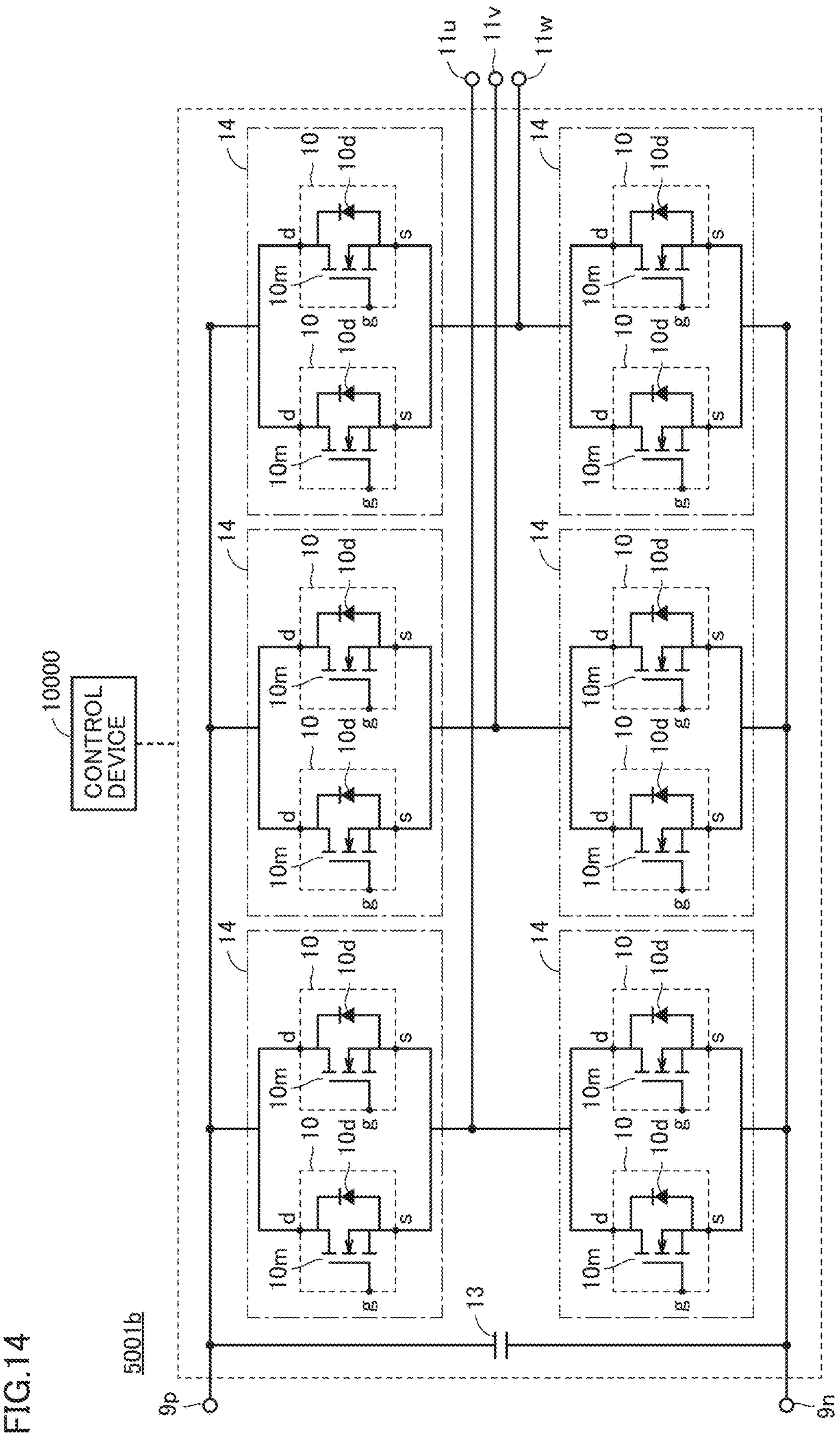
FIG. 14 is a diagram illustrating a second circuit configuration example of the DC/AC converter.

FIG. 14 is a diagram illustrating a second circuit configuration example of DC/AC converter 1007. As illustrated in FIG. 14, DC/AC converter 1007 includes a three-phase two-level inverter circuit 5001*b*. Three-phase two-level inverter circuit 5001*b* is different from three-phase two-level inverter circuit 5001 illustrated in FIG. 12 in that the each of the upper arm and the lower arm includes the plurality of second semiconductor elements 10 connected in parallel.

In the example of FIG. 14, the each of the upper arm and the lower arm includes a second power semiconductor module 14 having two second semiconductor elements 10 connected in parallel. Note that the number of second semiconductor elements 10 included in second power semiconductor module 14 may be greater than or equal to three.

Figure 15:
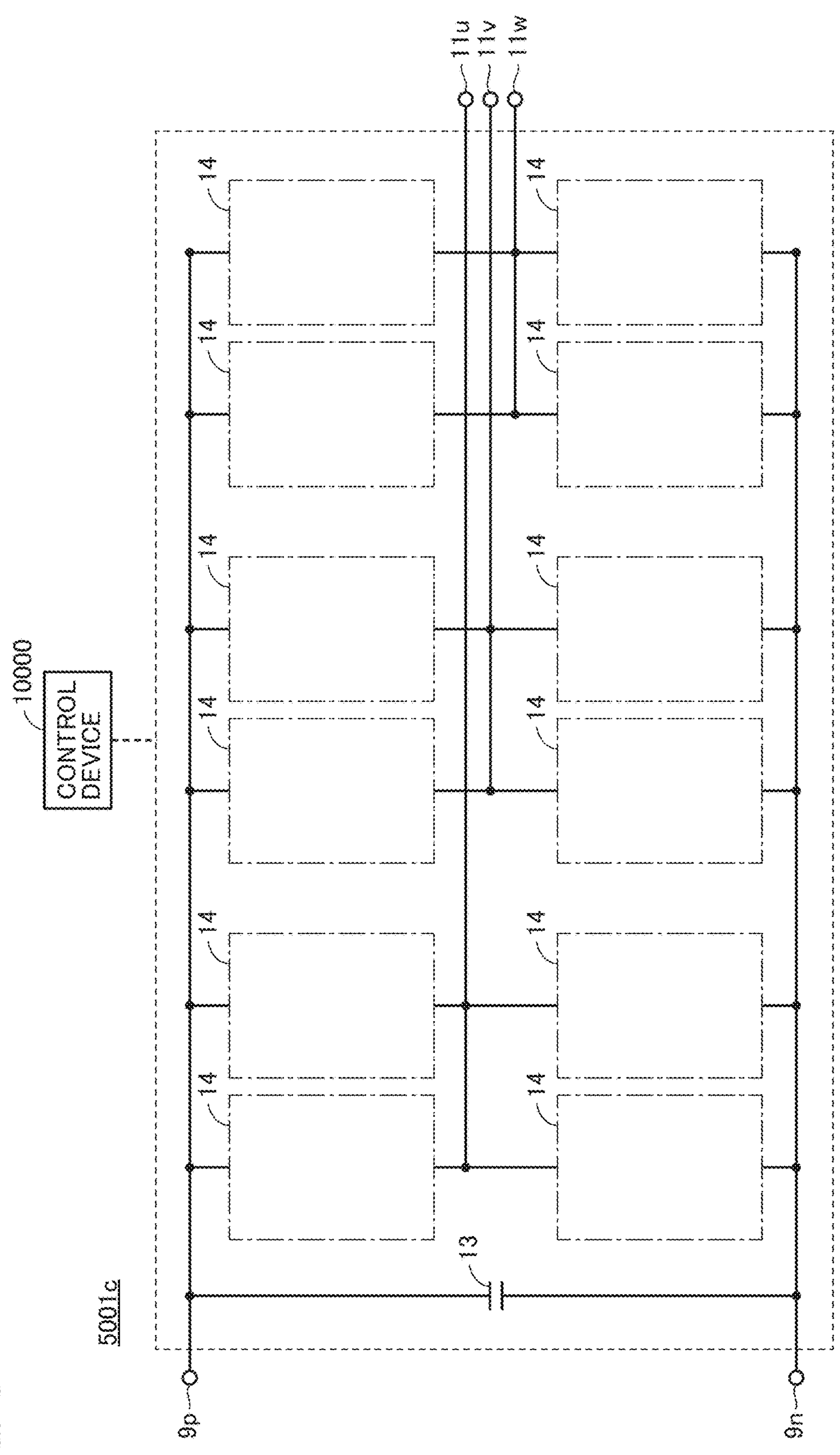
FIG. 15 is a diagram illustrating a third circuit configuration example of the DC/AC converter.

FIG. 15 is a diagram illustrating a third circuit configuration example of DC/AC converter 1007. As illustrated in FIG. 15, DC/AC converter 1007 includes a three-phase two-level inverter circuit 5001*c*. Three-phase two-level inverter circuit 5001*c* is different from three-phase two-level inverter circuit 5001 illustrated in FIG. 12 in that the each of the upper arm and the lower arm includes the plurality of second power semiconductor modules 14 connected in parallel.

In the example of FIG. 15, the each of the upper arm and the lower arm includes two second power semiconductor modules 14 connected in parallel. Although not illustrated, each of second power semiconductor modules 14 includes the plurality of second semiconductor elements 10 connected in parallel. Note that the number of second power semiconductor modules 14 included in the each of the arms may greater than or equal to 3.

Note that three-phase two-level inverter circuits 5001, 5001*b*, and 5001*c* may be configured by using discrete semiconductor elements. In addition, DC/AC converter 1007 is only required to have a DC/AC conversion function, and is not limited to the three-phase two-level inverter circuit. DC/AC converter 1007 may be a multi-level circuit, for example, a three-phase three-level inverter circuit, a three-phase five-level inverter circuit, a three-phase gradation inverter circuit, or the like.

Here, although the circuit configuration examples of the power converters included in the power system has been described above with DC/DC converter 1008 and DC/AC converter 1007 as examples, DC/DC converters 1008*b*, 1008*c*, and 1010 can have a circuit configuration similar to that of DC/DC converter 1008. In addition, DC/AC converter 1009 can have a circuit configuration similar to that of DC/AC converter 1007. However, a rated voltage, a rated current, and the like of the each of the semiconductor elements constituting a respective power converter are different depending on a capacity of the load.

In addition, in each of semiconductor elements 1 and 10, a configuration example in which the MOSFET is adopted as the switching element, the parasitic diode of the MOSFET is used as the freewheeling diode, or the freewheeling diode is connected in anti-parallel to the switching element has been described. However, a silicon (Si)-MOSFET, a silicon carbide (SIC)-MOSFET, a Si-insulated gate bipolar transistor (Si-IGBT), a SiC-IGBT, a GaN-high electron mobility transistor (GaN-HEMT), or the like can be used as the switching element. In addition, a Si-diode, a SiC-diode, a SiC-Schottky barrier diode (SiC-SBD), or the like can be used as the freewheeling diode. Note that in a case where the IGBT is used as the switching element, it is always necessary to connect the freewheeling diode in anti-parallel to the switching element. However, in a case where the RC-IGBT is used as the switching element, it is not necessary to connect the freewheeling diode to the switching element. Moreover, it is also possible to use a high withstand voltage semiconductor element using gallium oxide (GaO) or diamond.

<Configuration Example of Power Semiconductor Module>

Next, a configuration example of power semiconductor modules 6 and 14 will be described with reference to FIG. 16. Hereinafter, first power semiconductor module 6 will be described as an example.

Figure 16:
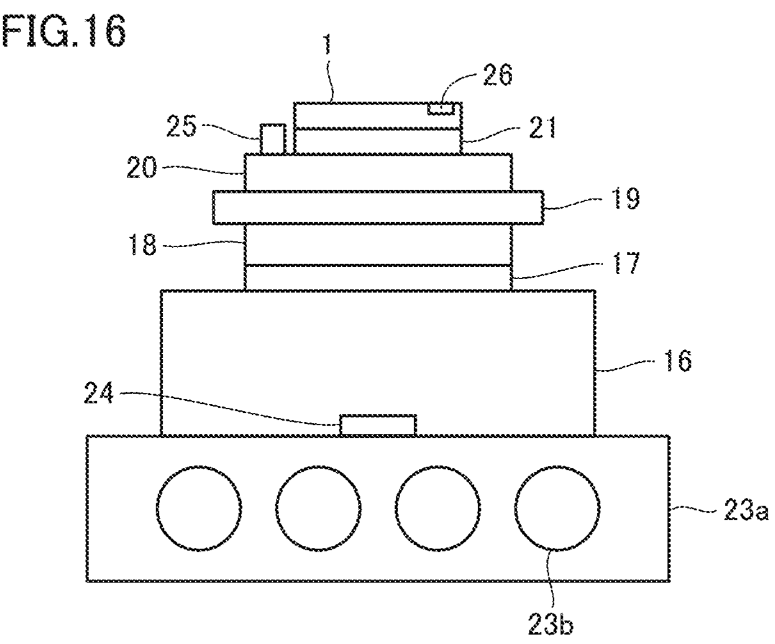
FIG. 16 is a schematic configuration diagram of a first power semiconductor module.

FIG. 16 is a schematic configuration diagram of first power semiconductor module 6. As illustrated in FIG. 16, first power semiconductor module 6 includes first semiconductor element 1, bonding materials 17 and 21, a front electrode 20, an insulating material 19, a back electrode 18, a base plate 16, and a water-cooling device 23*a*.

First semiconductor element 1 is bonded to front electrode 20 with bonding material 21. Bonding materials 17 and 21 are, for example, a paste made of silver (Ag) or copper (Cu), a solder, or the like. Front electrode 20 and back electrode 18 are made of Cu, aluminum (Al), or the like. Front electrode 20 and back electrode 18 are attached to insulating material 19 with a brazing material or the like. Insulating material 19 is made of silicon nitride ($Si_3N_4$), alumina ($Al_2O_3$), aluminum nitride (AlN), a resin material, or the like.

Back electrode 18 is bonded to base plate 16 with bonding material 21. Base plate 16 is made of aluminum-silicon carbide (Al—SiC), magnesium-silicon carbide Mg—SiC), Al, Cu, an Al alloy, a Cu alloy, or the like. Base plate 16 is bonded to water-cooling device 23*a* by a screw, caulking, or the like. Water-cooling device 23*a* is formed with a cooling pipe 23*b*.

Note that in the example of FIG. 16, water-cooling device 23*a* is exemplified as a cooling device, but an air-cooling device including fins may be used. In addition, grease or a heat spreader for diffusing heat radiation may be interposed between base plate 16 and water-cooling device 23*a*.

In addition, the configuration of the power semiconductor module is not limited to the example of FIG. 16, and a configuration in which base plate 16 is directly bonded to water-cooling device 23*a*, a configuration in which cooling is performed from both surfaces of first semiconductor element 1, or the like can be adopted.

<Accidental Failure of Semiconductor Element>

Next, the accidental failure of the semiconductor element will be described with reference to FIG. 17. Hereinafter, an accidental failure of second semiconductor element 10 will be representatively described.

Figure 17:
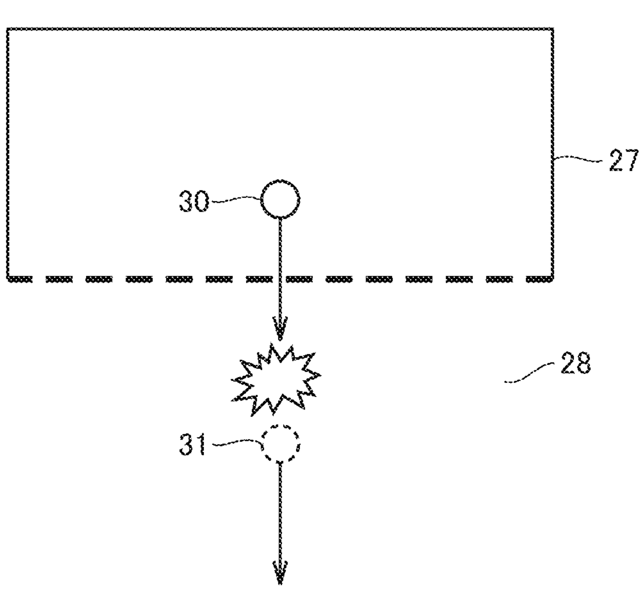
FIG. 17 is a diagram illustrating a mechanism in which neutrons occur.

FIG. 17 is a diagram illustrating a mechanism for generating neutrons that may cause the accidental failure of the semiconductor element.

As illustrated in FIG. 17, cosmic rays 30 exist in a space 27 and constantly falls on the earth. When entering an atmosphere 28 of the earth, cosmic rays 30 collide with the atmosphere to generate neutrons 31. Neutrons 31 may collide with second semiconductor element 10 mounted on an aircraft operating on a ground surface 29 or flying in the sky. In a case where a high voltage is applied to second semiconductor element 10, second semiconductor element 10 may fail due to the collision with neutrons 31. Such phenomenon is called single event burnout (SEB).

Figure 18:
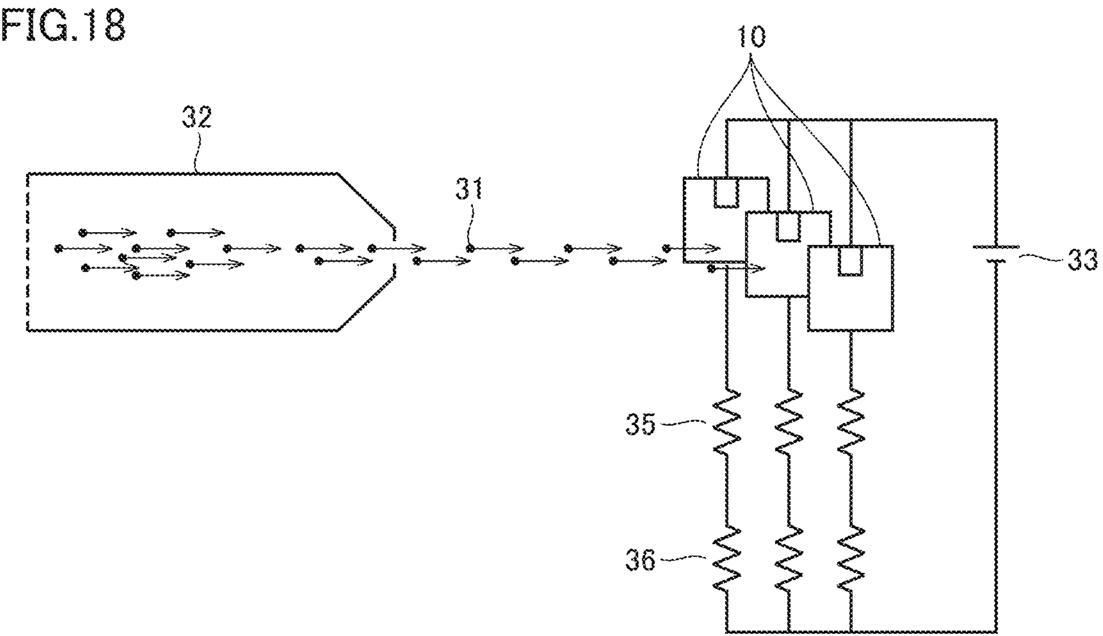
FIG. 18 is a diagram illustrating an experimental example of the failure rate of the semiconductor element.

A failure rate of the semiconductor element due to the SEB can be experimentally obtained. FIG. 18 is a diagram illustrating an experimental example of the failure rate of the semiconductor element. As illustrated in FIG. 18, the plurality of (for example, three) second semiconductor elements 10 are connected in parallel between a positive electrode and a negative electrode of a DC power source 33. A voltage-dividing resistor 35 and a leakage-measuring resistor 36 are connected in series with the each of second semiconductor elements 10 between the positive electrode and the negative electrode of DC power source 33.

In a case where the each of second semiconductor elements 10 includes the MOSFET, DC power source 33 is electrically connected between a drain and a source of the MOSFET. By short-circuiting a gate and the source of the MOSFET or applying a negative bias between the gate and the source, the drain and the source of the MOSFET are kept in a high resistance state.

At this time, a DC voltage of DC power source 33 is divided by second semiconductor elements 10, voltage-dividing resistor 35, and resistor 36. A drain-source resistance of the each of second semiconductor element 10, voltage-dividing resistor 35, and resistor 36 has a relationship in which a resistance value of resistor 36 is sufficiently smaller than a resistance value of voltage-dividing resistor 35, and the resistance value of voltage-dividing resistor 35 is sufficiently smaller than a resistance value of the drain-source resistance of the each of second semiconductor elements 10. Therefore, most of the DC voltage of DC power source 33 is applied to second semiconductor element 10. On the other hand, in a case where the each of second semiconductor elements 10 fails and the resistance value of the drain-source resistance decreases, the most of the DC voltage of DC power source 33 is applied to voltage-dividing resistor 35.

An inter-terminal voltage of resistor 36 is detected by a data logger (not illustrated). A leakage current can be calculated from a detection value of the inter-terminal voltage of resistor 36 and the resistance value of resistor 36. In a case where second semiconductor elements 10 are normal, the leakage current is small, and the leakage current increases due to the failures of second semiconductor elements 10.

In an experiment, second semiconductor elements 10 are irradiated with neutrons 31 from an accelerator 32 in a state where the DC voltage is applied to second semiconductor elements 10 from DC power source 33. When neutrons 31 collide with second semiconductor elements 10, the SEB stochastically occurs, and second semiconductor elements 10 fail.

Figure 19:
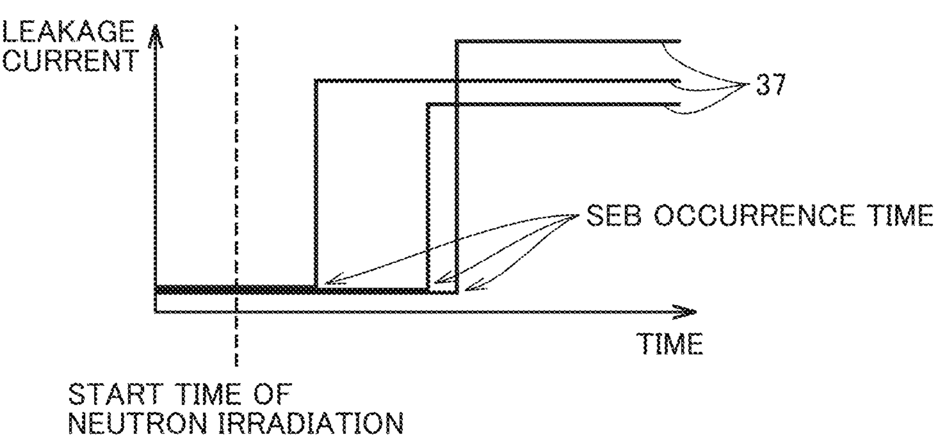
FIG. 19 is a diagram illustrating variation of leakage current during irradiation with the neutrons.

FIG. 19 is a diagram illustrating variation of leakage current during irradiation with neutrons 31. FIG. 19 illustrates waveforms 37 of three leakage currents. Three waveforms 37 represent the leakage current flowing through each of three second semiconductor elements 10 illustrated in FIG. 18.

As illustrated in FIG. 19, in a state where the voltage is applied to the each of second semiconductor elements 10, a leakage current at a start time of neutron irradiation is small. If the each of second semiconductor element 10 is continuously irradiated with the neutrons, the SEB occurs in the each of second semiconductor elements 10. Since the SEB occurs accidentally, SEB occurrence times are different among the three second semiconductor elements 10.

A failure rate of the each of second semiconductor elements 10 can be calculated from a total number of second semiconductor elements 10 used in the experiment, a time at which the each of second semiconductor elements 10 fails, and the number of second semiconductor elements 10 failed. Note that the failure rate is generally calculated by using an index called the "Failure-in-Time (FIT)". The FIT is a unit representing the failure rate, and represents the number of the second semiconductor elements failing within the ninth power of ten hours. For example, "1 FIT" means a probability that one failure occurs within the ninth power of ten hours. A lower FIT indicates a lower failure rate.

In the experiment illustrated in FIG. 18, the number of the neutrons with which the irradiation is performed per unit time and per unit area is larger than the number of the neutrons actually falling on the natural world per unit time and per unit area. Therefore, the experiment is substantially an accelerated test. Accordingly, the FIT under an environment in which second semiconductor elements 10 are placed is corrected by using the number of the neutrons per unit time and per unit area under the environment.

Figure 20:
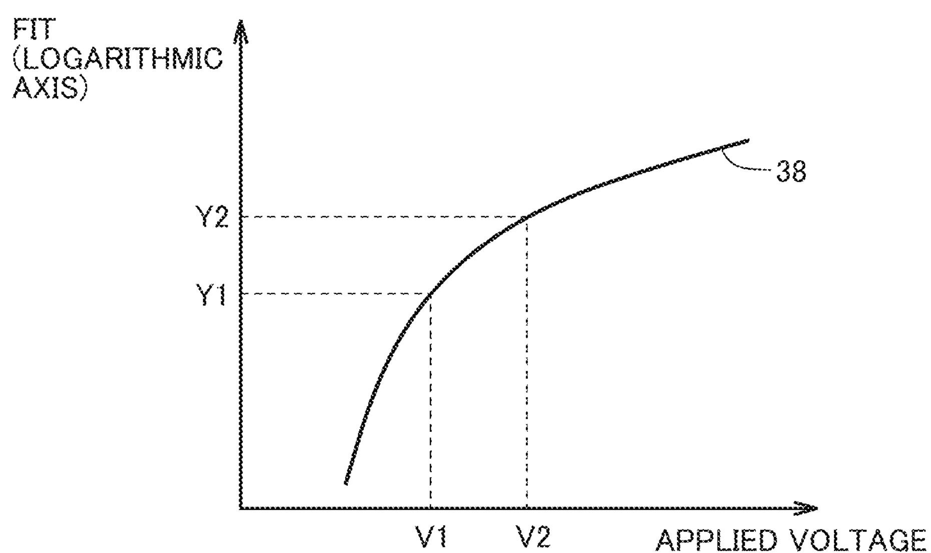
FIG. 20 is a diagram illustrating a relationship between a voltage applied to the second semiconductor element and a FIT of one second semiconductor element.

The FIT of one second semiconductor element 10 increases as the voltage applied to second semiconductor element 10 increases. FIG. 20 is a diagram illustrating a relationship between a voltage applied to second semiconductor element 10 and a FIT of one second semiconductor element 10. In FIG. 20, a horizontal axis represents an applied voltage, and a vertical axis represents the FIT.

FIG. 20 illustrates a FIT curve 38 of second semiconductor element 10. According to FIT curve 38, the FIT when a voltage V1 is applied is Y1, and the FIT when a voltage V2 is applied is Y2. If V1<V2, then Y1<Y2. Accordingly, it can be seen that the FIT of second semiconductor element 10 can be controlled by adjusting the voltage applied to second semiconductor element 10.

Figure 21:
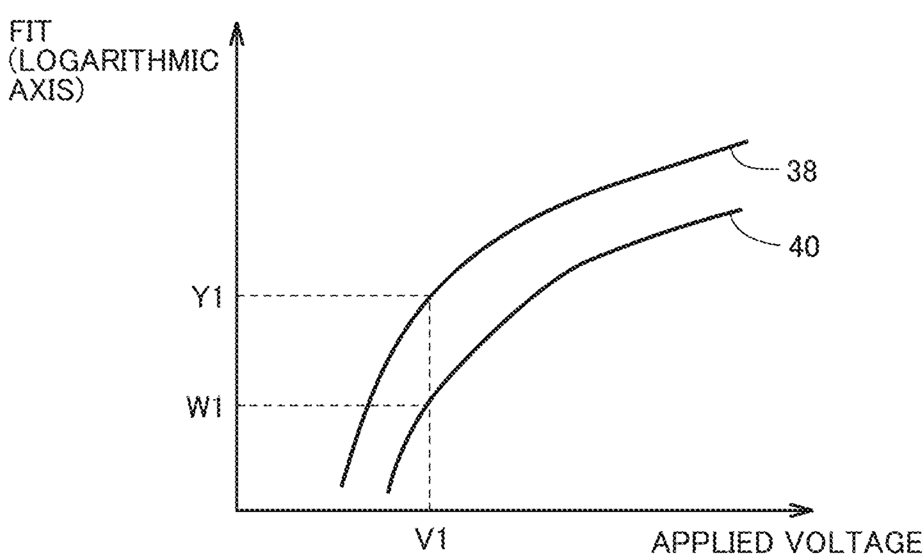
FIG. 21 is a diagram illustrating a correlation between a withstand voltage and the FIT of the semiconductor element.

Note that the FIT is correlated with the withstand voltage of the semiconductor element, and it is known that the FIT decreases as the withstand voltage of the semiconductor element increases. FIG. 21 is a diagram illustrating the correlation between a withstand voltage and the FIT of the semiconductor element. FIG. 21 illustrates first FIT curve 38 indicating the relationship between the applied voltage and the FIT of second semiconductor element 10, and a second FIT curve 40 indicating a relationship between an applied voltage and a FIT of a high withstand-voltage semiconductor element 39 having a higher withstand voltage than second semiconductor element 10.

Comparing first FIT curve 38 with second FIT curve 40, the FIT of second semiconductor element 10 becomes Y1 when voltage V1 is applied, whereas the FIT of high withstand-voltage semiconductor element 39 becomes W1 lower than Y1. Note that the correlation between the withstand voltage and the FIT of the semiconductor element illustrated in FIG. 21 remains unchanged regardless of a height at which the semiconductor element is placed.

Note that it is assumed that second semiconductor element 10 and high withstand-voltage semiconductor element 39 in FIG. 21 are both the MOSFETs and have an equal element area. A difference between second semiconductor element 10 and high withstand-voltage semiconductor element 39 is only a thickness or a concentration of a drift layer that holds the withstand voltage of the MOSFET.

In a case where an element structure is greatly different among a plurality of MOSFETs having different withstand voltages, electric field distribution inside the MOSFETs may be greatly different. As a result, first FIT curve 38 and second FIT curve 40 may intersect or a vertical relationship may be reversed. For example, in a case where semiconductor materials are different between second semiconductor element 10 and high withstand-voltage semiconductor element 39, first FIT curve 38 and second FIT curve 40 may intersect or the vertical relationship may be reversed. Assuming these cases, the relationship between the applied voltage and the FIT of the semiconductor element should be confirmed by acquiring the FIT curves by performing the experiment described above (see FIG. 19) for the each of the semiconductor elements.

Figure 22:
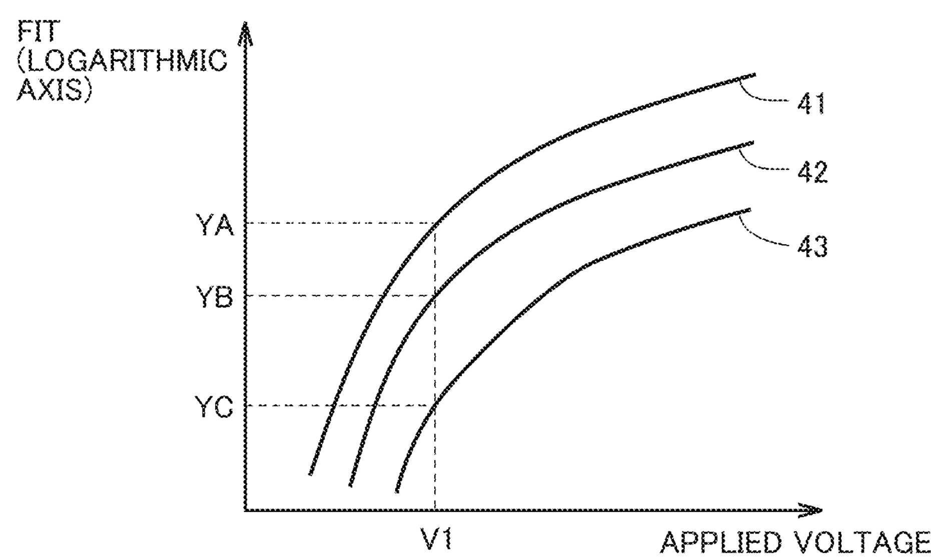
FIG. 22 is a diagram illustrating a correlation between a junction temperature and the FIT of the second semiconductor element.

In addition, the FIT is also correlated with the temperature (the junction temperature) of the semiconductor element, and the FIT tends to decrease as the junction temperature increases. FIG. 22 is a diagram illustrating a correlation between a junction temperature and the FIT of second semiconductor element 10. FIG. 22 illustrates FIT curves 41 to 43 indicating a relationship between the junction temperature and the FIT of second semiconductor element 10. A third FIT curve 41 is a FIT curve when the junction temperature is A [° C.]. A fourth FIT curve 42 is a FIT curve when the junction temperature is B [° C.]. A fifth FIT curve 43 is a FIT curve when the junction temperature is C [° C.]. Note that A [° C.]<B [° C.]<C [° C.].

According to FIG. 22, in a case where voltage V1 is applied to second semiconductor element 10, the FIT is YA when the junction temperature is A [° C.], the FIT is YB when the junction temperature is B [° C.], and the FIT is YC when the junction temperature is C [° C.]. Note that YC<YB<YA.

In general, the withstand voltage increases as the junction temperature of the semiconductor element increases, and the withstand voltage decreases as the junction temperature decreases. Therefore, in FIG. 22, the withstand voltage increases as the junction temperature increases, and thus the FIT decreases. On the contrary, the withstand voltage decreases as the junction temperature decreases, and thus the FIT increases.

The correlation between the junction temperature and the FIT of the semiconductor element remains unchanged regardless of a height of a place where the semiconductor element is located. However, since the correlation between the junction temperature and the FIT is not necessarily proportional, the relationship between the applied voltage and the FIT of the each of the semiconductor elements should be confirmed by changing the junction temperature and acquiring the FIT curve depending on the junction temperature for the each of the semiconductor elements in the experiment described above (see FIG. 19).

Next, FITs of second power semiconductor module 14 and three-phase two-level inverter circuit 5001 on which the above second semiconductor element 10 is mounted will be described.

Figure 23:
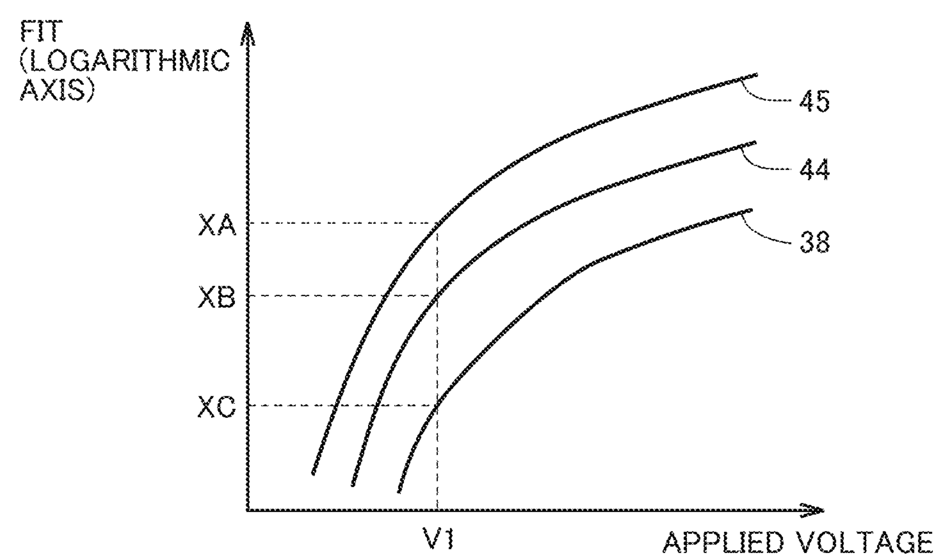
FIG. 23 is a diagram illustrating a FIT of each of the second semiconductor element, a second power semiconductor module, and a three-phase two-level inverter circuit.

FIG. 23 is a diagram illustrating a FIT of each of second semiconductor element 10, second power semiconductor module 14, and three-phase two-level inverter circuit 5001. In FIG. 23, first FIT curve 38 is a FIT curve of one second semiconductor element 10. A sixth FIT curve 44 is a FIT curve of one second power semiconductor module 14. A seventh FIT curve 45 is a FIT curve of one three-phase two-level inverter circuit 5001.

The FIT of second power semiconductor module 14 on which the plurality of second semiconductor elements 10 are mounted increases in proportion to the number of second semiconductor elements 10 mounted. Specifically, sixth FIT curve 44 of one second power semiconductor module 14 is calculated by the following expression (1) with first FIT curve 38 of one second semiconductor element 10.

Sixth FIT curve 44=first FIT curve 38×number of second semiconductor elements 10 mounted (1)

However, in expression (1), both sixth FIT curve 44 and first FIT curve 38 are FIT curves at the height of 0 m above sea level.

The FIT of three-phase two-level inverter circuit 5001 including the plurality of second power semiconductor modules 14 increases in proportion to the number of second power semiconductor modules 14 mounted. Specifically, seventh FIT curve 45 of one three-phase two-level inverter circuit 5001 is calculated by the following expression (2) with sixth FIT curve 44 of one second power semiconductor module 14.

Seventh FIT curve 45=sixth FIT curve 44×number of second power semiconductor modules 14 mounted (2)

However, in expression (2), both seventh FIT curve 45 and sixth FIT curve 44 are the FIT curves at the height of 0 m above sea level.

According to the above expressions (1) and (2), first FIT curve 38, sixth FIT curve 44, and seventh FIT curve 45 have a relationship as illustrated in FIG. 23. For example, in a case where voltage V1 is applied to each of buses of second semiconductor element 10, second power semiconductor module 14, and three-phase two-level inverter circuit 5001, the FIT of second semiconductor element 10 of XC, the FIT of second power semiconductor module 14 of XB, and the FIT of three-phase two-level inverter circuit 5001 of XA has a relationship of XC<XB<XA.

Note that the correlation between the number and the FIT of second semiconductor elements 10 mounted on second power semiconductor module 14, and the correlation between the number and the FIT of second power semiconductor modules 14 mounted on three-phase two-level inverter circuit 5001 both remain unchanged regardless of the height.

In the calculation of the FIT described above, an example has been shown in which seventh FIT curve 45 of three-phase two-level inverter circuit 5001 is calculated on the basis of first FIT curve 38 of one second semiconductor element 10. However, the FIT of each of DC/DC converters 1008, 1008*b*, 1008*c* and 1010, and DC/AC converters 1007 and 1009 can be calculated by using the FIT curves of the semiconductor elements mounted on the power converter.

<Dependency of Neutrons on Height, Latitude and Longitude>

Next, dependency of the neutrons on the height, the latitude, and the longitude will be described.

The number of the neutrons per unit time and unit area [number/(time or area)] varies depending on the height, the latitude, and the longitude of the place where the neutrons are located. In the following description, the number of the neutrons per unit time and unit area is also simply referred to as "number of the neutrons". The number of the neutrons corresponds to the amount of the neutrons.

Spectra of the neutrons depending on the height, the latitude, and the longitude can be calculated by using, for example, an EXPACS (excel-based program for calculating atomic cosmic-ray spectrum). The EXPACS refers to a program capable of calculating a cosmic ray flux and energy thereof at any place and time in the atmosphere. The spectra of the neutrons refer to data representing the number of the neutrons present for a wide energy band of the neutrons per unit time and unit area. From the spectra of the neutrons obtained by the EXPACS, it is possible to acquire data indicating the dependency of the number of the neutrons having any energy on the height, the latitude, and the longitude.

Figure 24:
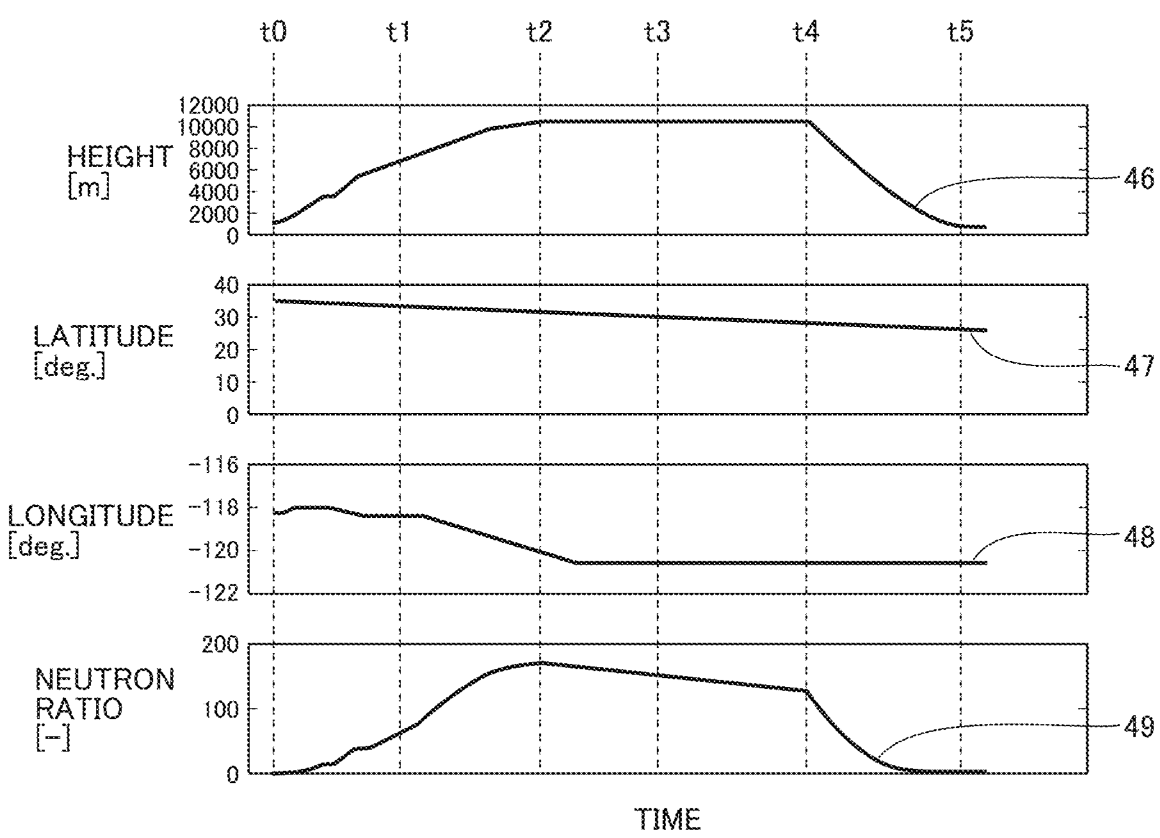
FIG. 24 is a diagram illustrating an example of a neutron ratio calculated on the basis of height, latitude, and longitude data when the aircraft flies on an optional date.

FIG. 24 is a diagram illustrating an example of neutron ratio 49 calculated on the basis of height data 46, latitude data 47, and longitude data 48 when the aircraft flies on the optional date. In the present description, the "neutron ratio" means a ratio of the number of the neutrons per unit time and unit area calculated from the height, the latitude, and the longitude to the number of the neutrons per unit time and unit area at the place of 0 m above sea level on arbitrary coordinates.

In FIG. 24, a time t0 indicates a time before takeoff of the aircraft, a time t1 indicates a time when the height increases, a time t2 indicates a time when the height reaches a maximum height, a time t3 indicates a time when the aircraft is flying at the maximum height, a time t4 indicates a time before the height decreases, and a time t5 indicates a time after landing. During a period from before the takeoff (the time t0) to after the landing (the time t5) of the aircraft, height data 46 indicating a height of the aircraft varies in a range of 0 to 12000 [m]. Latitude data 47 indicating the latitude of the aircraft varies from 35 [deg] to 20 [deg]. Longitude data 48 indicating the longitude of the aircraft varies from −118 [deg] to −120 [deg].

Neutron ratio 49 is calculated on the basis of the number of the neutrons calculated from height data 46, latitude data 47, and longitude data 48 at each of the times. From FIG. 24, it can be seen that neutron ratio 49 varies within a range of 0 to 200 following the variations of height data 46, latitude data 47 and longitude data 48. Note that as the number of the neutrons increases, neutron ratio 49 increases. Accordingly, neutron ratio 49 greatly varies depending on the height, the latitude, and the longitude of the aircraft.

Neutron ratio 49 is directly linked to the failure rate of the each of the semiconductor elements. Hereinafter, a relationship between neutron ratio 49 and the failure rate will be described by taking three-phase two-level inverter circuit 5001 as an example.

Expression (2) indicating seventh FIT curve 45 of three-phase two-level inverter circuit 5001 can be transformed as in Expression (3) in consideration of neutron ratio 49.

Seventh FIT curve 45=sixth FIT curve 44×number of second power semiconductor modules 14 mounted×neutron ratio 49 (3)

However, in expression (3), sixth FIT curve 44 is the FIT curve at the height of 0 m above sea level.

Figure 25:
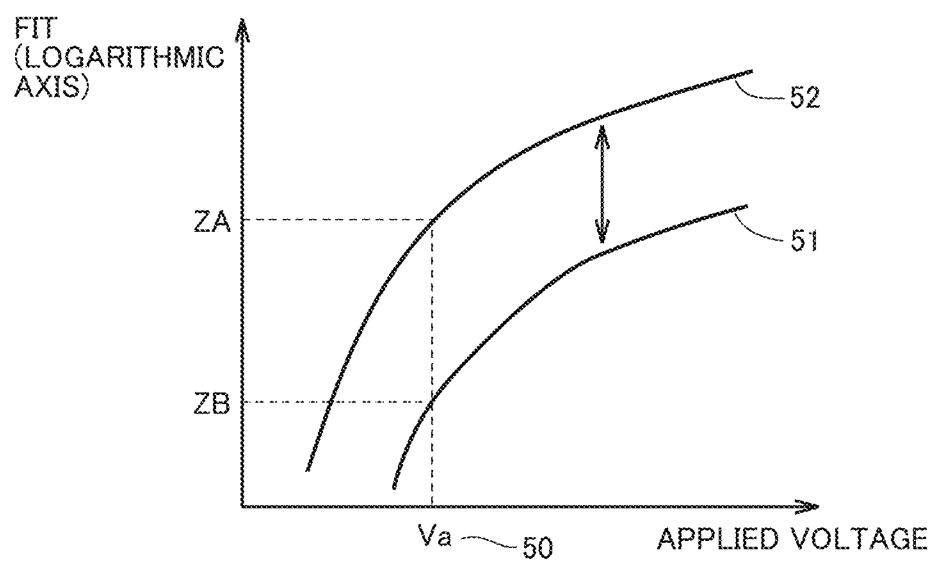
FIG. 25 is a diagram illustrating a correlation between the FIT of the three-phase two-level inverter circuit and the neutron ratio.

FIG. 25 is a diagram illustrating a correlation between the FIT of three-phase two-level inverter circuit 5001 and neutron ratio 49. In FIG. 25, an eighth FIT curve 51 is a FIT curve of one three-phase two-level inverter circuit 5001 when neutron ratio 49 is a first value. A ninth FIT curve 52 is a FIT curve of one three-phase two-level inverter circuit 5001 when neutron ratio 49 is a second value larger than the first value.

According to FIG. 25, in a case where an input voltage 50 to three-phase two-level inverter circuit 5001 is Va, the FIT is ZA when neutron ratio 49 is the second value, and the FIT is ZB when neutron ratio 49 is the first value. Note that ZB<ZA. In other words, in case where the input voltages are equal, the FIT of three-phase two-level inverter circuit 5001 increases as neutron ratio 49 increases.

Figure 26:
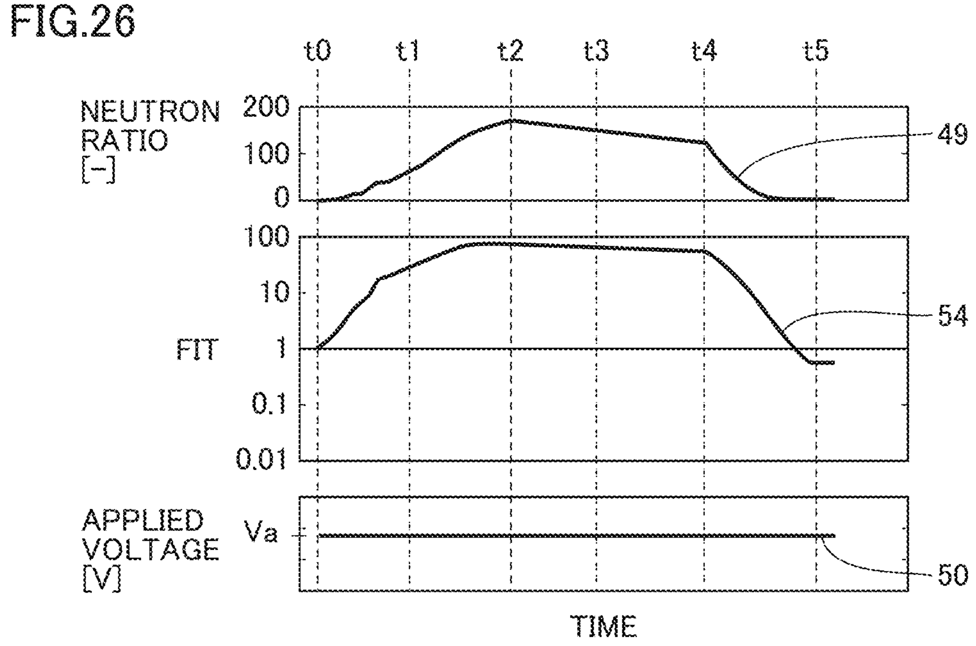
FIG. 26 is a diagram illustrating an example of the neutron ratio when the aircraft flies on the optional date, and first FIT data and the input voltage of the three-phase two-level inverter circuit.

FIG. 26 is a diagram illustrating an example of neutron ratio 49 when the aircraft flies on the optional date, and first FIT data 54 and input voltage 50 of three-phase two-level inverter circuit 5001. Note that neutron ratio 49 illustrated in FIG. 26 is calculated on the basis of height data 46, latitude data 47, and longitude data 48 illustrated in FIG. 24. First FIT data 54 is calculated by using neutron ratio 49 and expression (3).

In FIG. 26, input voltage 50 to three-phase two-level inverter circuit 5001 indicates a voltage applied between input positive bus 9*p* and input negative bus 9*n* of three-phase two-level inverter circuit 5001, and is maintained at the constant voltage Va.

From FIG. 26, it can be seen that if neutron ratio 49 varies under input voltage 50 being the constant voltage Va, first FIT data 54 of three-phase two-level inverter circuit 5001 also varies following the variation of neutron ratio 49. The FIT increases as neutron ratio 49 increases, and the FIT decreases as neutron ratio 49 decreases.

Here, it is assumed that a safety design value of three-phase two-level inverter circuit 5001 is set to less than or equal to 1 FIT. In a case where input voltage 50 is the constant voltage Va, first FIT data 54 is less than or equal to 1 FIT at time t0 and time t5, but transition to a higher value than 1 FIT while the aircraft is in flight. This indicates that three-phase two-level inverter circuit 5001 does not satisfy the safety design value, and has a low reliability against the SEB.

Therefore, in the present embodiment, in a case where a route of the aircraft is known in advance, neutron ratio 49 is calculated by using height data 46, latitude data 47, and longitude data 48 of the route, and input voltage 50 of three-phase two-level inverter circuit 5001 is adjusted on the basis of the calculated neutron ratio 49.

Figure 27:
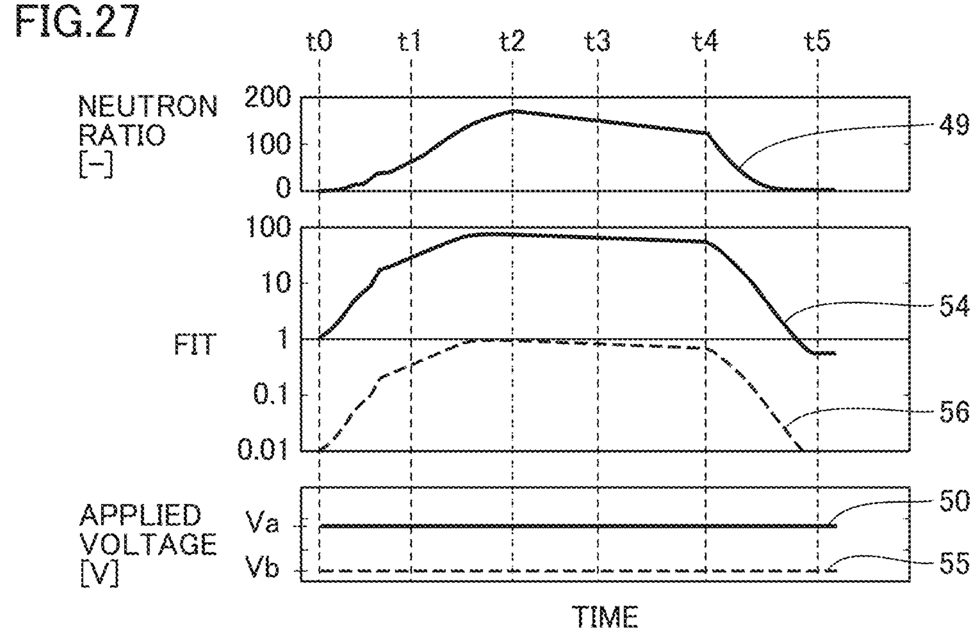
FIG. 27 is a diagram illustrating an example of adjustment of the input voltage of the three-phase two-level inverter circuit.

FIG. 27 is a diagram illustrating an example of adjustment of the input voltage of three-phase two-level inverter circuit 5001. FIG. 27 is similar to FIG. 26 with second FIT data 56 and an input voltage 55 added.

As illustrated in FIG. 27, while aircraft 1000 is in flight, input voltage 55 of three-phase two-level inverter circuit 5001 is maintained at a voltage Vb lower than voltage Va. Second FIT data 56 indicates a variation of the FIT when neutron ratio 49 varies under input voltage 55 being a constant voltage Vb. By lowering input voltage 55, second FIT data 56 is suppressed to less than or equal to 1 FIT while the aircraft is in flight. Accordingly, the reliability of three-phase two-level inverter circuit 5001 against the SEB is ensured while the aircraft is in flight.

Next, adjustment of the input voltages of the power converters in the power system of aircraft 1000 illustrated in FIGS. 1 to 6 will be described.

In the first configuration example (see FIG. 1) and the second configuration example (see FIG. 2) of the power system, the input voltage of DC/AC converter 1007 included in propulsion system 2001 is adjusted depending on neutron ratio 49 calculated from height data 46, latitude data 47, and longitude data 48 of the route. In other words, an output voltage of DC/DC converter 1008 is adjusted.

In the third configuration example of the power system (see FIG. 3), the input voltage of DC/AC converter 1009 included in electrical component system 2002 is adjusted depending on neutron ratio 49. In other words, an output voltage of DC/DC converter 1008*b* is adjusted.

In the fourth configuration example of the power system (see FIG. 4), the input voltage of DC/DC converter 1010 included in the electrical component system 2003 is adjusted depending on neutron ratio 49. In other words, an output voltage of DC/DC converter 1008*c* is adjusted.

In the fifth configuration example of the power system (see FIG. 5), the input voltage of DC/DC converter 1010 included in the electrical component system 2004 is adjusted depending on neutron ratio 49. In other words, an output voltage of AC/DC converter 1004 included in power source 2000 is adjusted.

In any of the configuration examples described above, in a case where the route is determined before aircraft 1000 is in flight, the input voltage of the each of the power converters can be determined in advance from height data 46, latitude data 47, and longitude data 48 of the route as illustrated in FIG. 27.

On the other hand, in a case where the route of the aircraft is unknown in advance, it is necessary to acquire height data 46, latitude data 47, and longitude data 48 while the aircraft is in flight, and determine the input voltage of the each of the power converters based on the acquired data.

Figure 28:
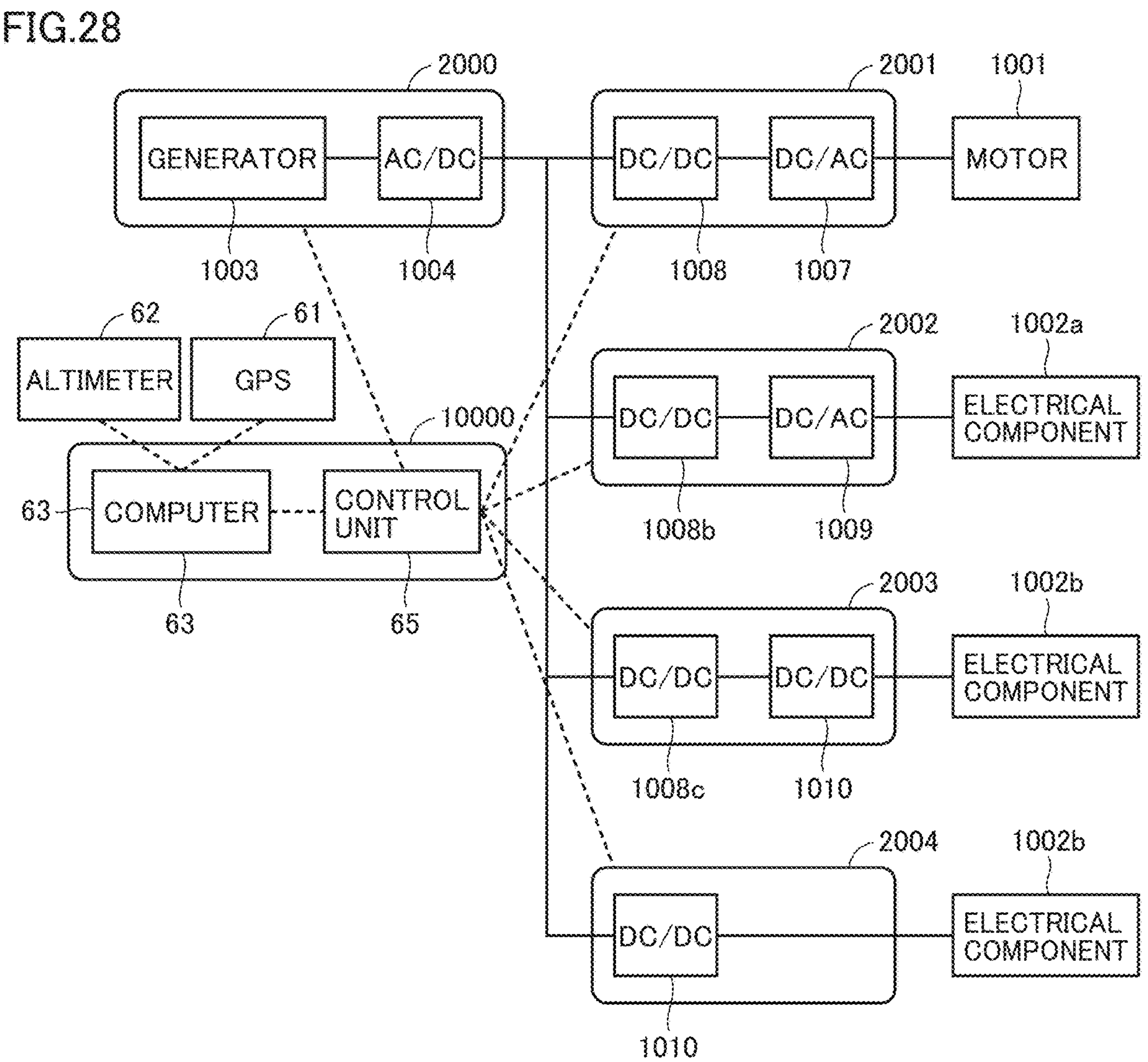
FIG. 28 is a diagram illustrating a configuration example of the power system having a function of adjusting the input voltages of the power converters.

FIG. 28 is the diagram illustrating the configuration example of the power system having the function of adjusting the input voltages of the power converters. The configuration example of the power system illustrated in FIG. 28 is similar to the sixth configuration example of the power system illustrated in FIG. 6 with a global positioning system (GPS) 61 and an altimeter 62 added. Since power source 2000, propulsion system 2001, electrical component systems 2002 to 2004, propulsion system motor 1001, and electrical components 1002*a* and 1002*b* are the same as those illustrated in FIG. 6, the description thereof will be omitted.

GPS 61 measures a latitude and a longitude of a current position of aircraft 1000 while aircraft 1000 is in flight, and outputs measured values thereof to control device 10000. Altimeter 62 measures the height of aircraft 1000, and outputs a measured value thereof to control device 10000. Note that in a case where the height of aircraft 1000 can be calculated from the measured values of GPS 61, altimeter 62 is unnecessary.

Control device 10000 includes a computer 63 and a control unit 65. Computer 63 calculates the neutron ratio at the current position of aircraft 1000 based on the measured values input from GPS 61 and altimeter 62. Computer 63 determines the input voltage of the each of the power converters by using the calculated neutron ratio, and outputs the determined input voltage to control unit 65. Control unit 65 adjusts the input voltage of the each of the power converters to be the determined input voltage.

Figure 29:
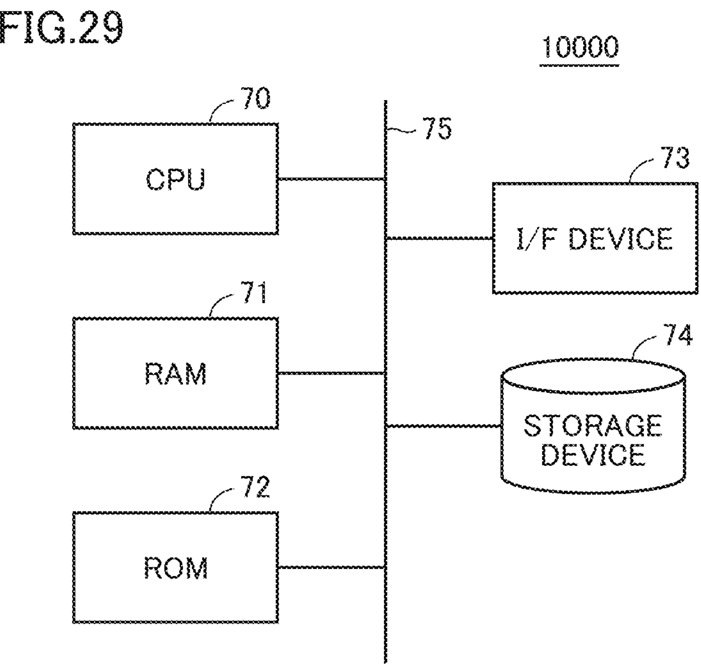
FIG. 29 is a diagram illustrating a hardware configuration of a computer.

FIG. 29 is a diagram illustrating a hardware configuration of control device 10000. As illustrated in FIG. 29, control device 10000 includes a central processing unit (CPU) 70, a random access memory (RAM) 71, a read only memory (ROM) 72, an interface (I/F) device 73, and a storage device 74. CPU 70, RAM 71, ROM 72, I/F device 73, and storage device 74 exchange various data through a communication bus 75.

CPU 70 develops a program stored in ROM 72 in RAM 71, and executes the program. A process executed by control device 10000 is described in the program stored in ROM 72.

I/F device 73 receives measurement data of various sensors including GPS 61 and altimeter 62. In addition, I/F device 73 transmits a control signal for controlling the each of the power converters to the each of the power converters.

Storage device 74 is a storage that stores various types of information, and stores information on the each of the power converters. The information on the each of the power converters includes information on the power semiconductor modules and the semiconductor elements constituting the each of the power converters. In addition, storage device 74 stores information relative to the failure rates of the power converters, the power semiconductor modules, and the semiconductor elements. The information relative to the failure rates includes information relative to the FIT curves illustrated in FIGS. 20 to 23 and 25. Storage device 74 is, for example, a hard disk drive (HDD) or a solid state drive (SSD).

Figure 30:
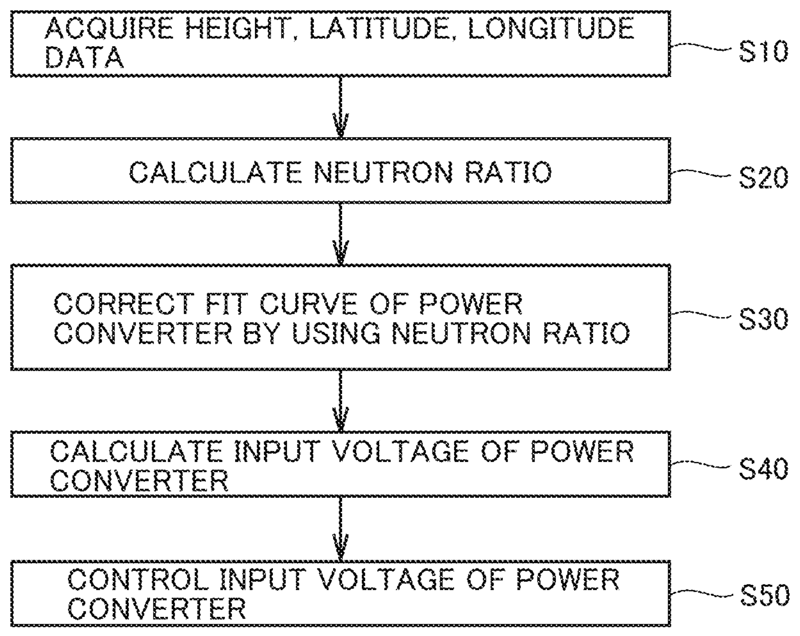
FIG. 30 is a flowchart illustrating an example of a procedure of a process of determining the input voltage of each of the power converters of the power system.

FIG. 30 is the flowchart illustrating the example of the procedure of the process of determining the input voltage of the each of the power converters of the power system. A series of processes illustrated in this flowchart is executed by control device 10000 at each predetermined control cycle while aircraft 1000 is in flight.

As illustrated in FIG. 30, first, control device 10000 acquires measurement data of the height of aircraft 1000 measured by altimeter 62, and acquires measurement data of the latitude and the longitude of the current position of aircraft 1000 measured by GPS 61 (step S10).

Next, control device 10000 calculates the neutron ratio at the current position of aircraft 1000 by using the measurement data of the height, the latitude, and the longitude of aircraft 1000 (step S20). In S20, control device 10000 calculates the number of the neutrons at the current position of aircraft 1000 based on the acquired measurement data of the height, the latitude, and the longitude. Then, computer 63 calculates a ratio of the number of the neutrons at the current position of aircraft 1000 to the number of the neutrons at the place of 0 m above sea level as the neutron ratio.

Next, control device 10000 corrects a FIT curve acquired in advance by using the calculated neutron ratio for the each of the power converters (step S30). In S30, control device 10000 corrects the FIT curve by substituting the neutron ratio calculated in S20 into expression (3) described above for the each of the power converters.

Next, control device 10000 calculates the input voltage by using the corrected FIT curve for the each of the power converters (step S40). In S40, control device 10000 calculates the input voltage at which the FIT can satisfy the safety design value (for example, less than or equal to 1 FIT) from the corrected FIT curve.

Finally, control device 10000 sets the calculated input voltage as a target value, and adjusts the input voltage of the each of the power converters to be the target value (step S50). For example, control device 10000 controls the output voltage of DC/DC converter 1008 to make the input voltage of DC/AC converter 1007 included in propulsion system 2001 be the target value.

Figure 31:
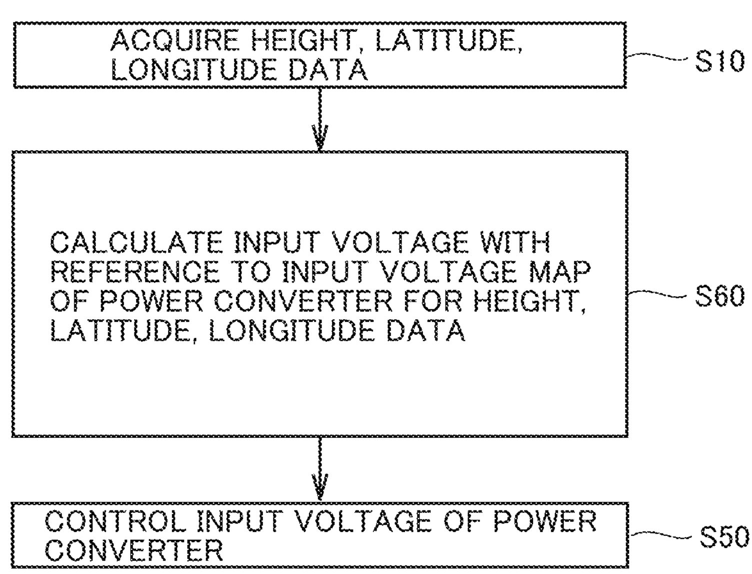
FIG. 31 is a flowchart illustrating another example of the procedure of the process of determining the input voltage of the each of the power converters of the power system.

FIG. 31 is a flowchart illustrating another example of the procedure of the process of determining the input voltage of the each of the power converters of the power system. A series of processes illustrated in this flowchart is executed by control device 10000 at each predetermined control cycle while aircraft 1000 is in flight.

In the flowchart illustrated in FIG. 31, the processes of S20 to S40 in the flowchart illustrated in FIG. 30 is replaced with a process of S60.

Upon acquiring the measurement data of the height, the latitude, and the longitude of aircraft 1000 in S10, control device 10000 calculates the input voltage based on the measurement data by referring to a map created in advance for the each of the power converters (step S60). The map defines a relationship among the height, the longitude, the latitude and the input voltage of the each of the power converters. The map can be created by correcting the FIT curve by using the neutron ratio calculated from the height, the longitude, and the latitude, and obtaining the input voltage at which the FIT satisfies the safety design value in the corrected FIT curve. The map is created in advance, and stored in storage device 74 (see FIG. 29) of control device 10000.

Control device 10000 sets the calculated input voltage as a target value, and adjusts the input voltage of the each of the power converters to be the target value (step S50).

As described above, by determining the input voltage of the each of the power converters by using the FIT curve corrected on the basis of the neutron ratio calculated from the height, the latitude, and the longitude of the route of the aircraft 1000, the reliability of the each of the power converters against the SEB can be secured while aircraft 1000 is in flight.

On the other hand, according to the route of aircraft 1000, as illustrated in FIG. 27, an upper limit of the input voltage of the each of the power converters is limited as the FIT satisfies the safety design value. Therefore, the upper limit of the output voltage of the each of the power converters is also limited, and as a result, there is a concern that a torque that can be output from propulsion system motor 1001 decreases.

In order to alleviate the limitation of the input voltage, it is conceivable to increase the upper limit of the input voltage by an amount of the FIT lowered by reducing the number of the power semiconductor modules mounted on the each of the power converters and the number of the semiconductor elements mounted on each of the power semiconductor modules. However, since the current that can flow through the power converters decreases, there is a concern that the power that can be supplied to the propulsion system motor is limited.

Therefore, in the present embodiment, by applying a redundant configuration in which the plurality of power converters are preliminarily arranged in parallel to the each of the power converters, the limitation of the input voltage of the each of the power converters is alleviated while the reliability against the SEB is ensured.

Figure 32:
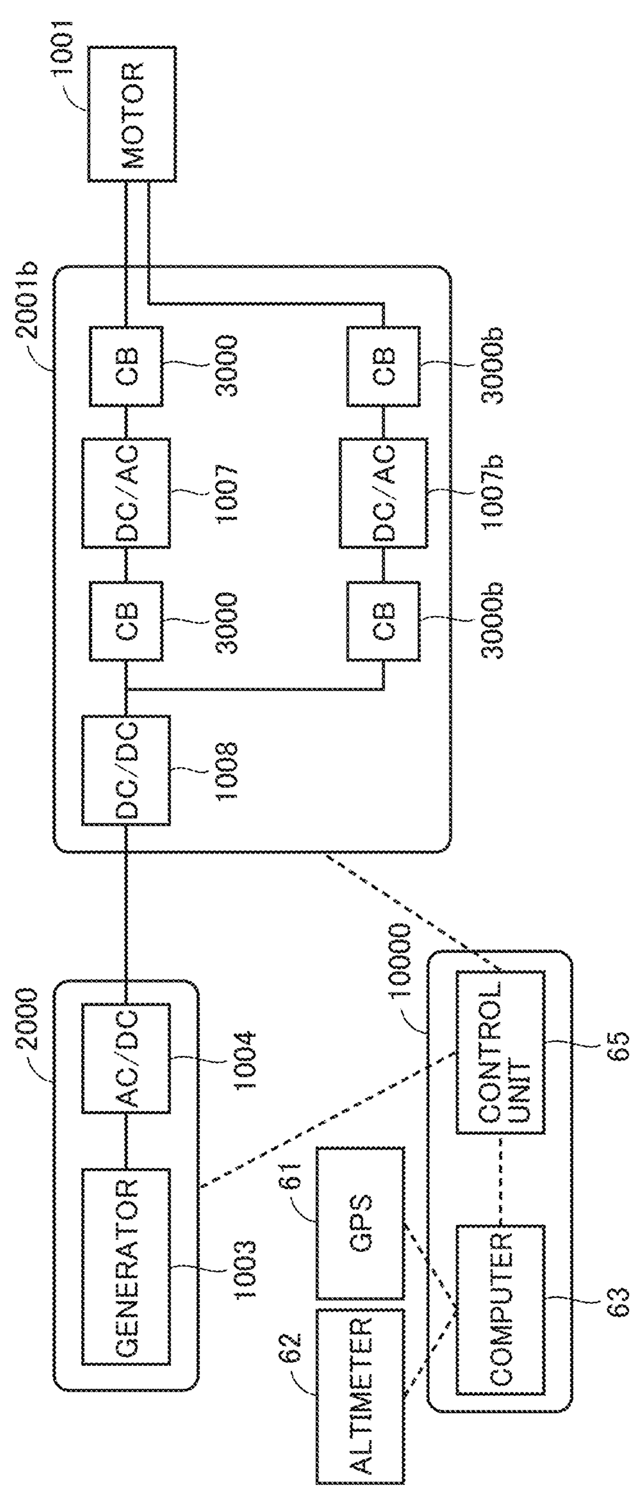
FIG. 32 is a diagram illustrating a configuration example of the power system including a power converter having the redundant configuration.

FIG. 32 is a diagram illustrating a configuration example of the power system including a power converter having the redundant configuration. The configuration example of the power system illustrated in FIG. 32 has the same basic configuration as the first configuration example illustrated in FIG. 1, but is different in including GPS 61, altimeter 62, and computer 63, as well as a propulsion system 2001*b* instead of propulsion system 2001.

Configurations and operations of GPS 61, altimeter 62, and control device 10000 are the same as those illustrated in FIGS. 28 to 30. In other words, computer 63 determines the input voltage of DC/AC converter 1007 included in propulsion system 2001*b* based on the measurement data of the height, the latitude, and the longitude of aircraft 1000 acquired from altimeter 62 and GPS 61. Computer 63 outputs the determined input voltage to control unit 65. Control unit 65 controls power source 2000 and the power converters included in propulsion system 2001*b*.

Propulsion system 2001*b* has the same basic configuration as propulsion system 2001 illustrated in FIG. 1, but is different in including a DC/AC converter 1007*b* and circuit breakers (CB) 3000 and 3000*b*.

DC/AC converter 1007*b* is connected to DC/DC converter 1007 in parallel with respect to an output node of DC/AC converter 1008. DC/AC converter 1007*b* constitutes a redundant DC/AC converter for DC/AC converter 1007. In other words, propulsion system 2001*b* has a redundant configuration in which two DC/AC converters 1007 and 1007*b* are arranged in parallel. Hereinafter, DC/AC converter 1007*b* is also referred to as “redundant DC/AC converter 1007*b*”. DC/AC converter 1007 corresponds to an example of the “first power converter”. Redundant DC/AC converter 1007*b* corresponds to an example of the “second power converter”.

CB 3000 is arranged between the output node of DC/DC converter 1008 and an input node of DC/AC converter 1007. CB 3000 is arranged between an output node of DC/AC converter 1007 and propulsion system motor 1001.

CB 3000*b* is arranged between the output node of DC/DC converter 1008 and an input node of redundant DC/AC converter 1007*b*. CB 3000*b* is arranged between an output node of redundant DC/AC converter 1007*b* and propulsion system motor 1001. CB 3000 and CB 3000*b* have the same configuration, and are opened by control device 10000 to block the current flowing through a corresponding DC/AC converter.

In the redundant configuration, for example, in a case where DC/AC converter 1007 fails, CB 3000 is opened and DC/AC converter 1007 is disconnected from a power transmission path. Thereafter, propulsion system motor 1001 is continuously operated by power supply with redundant DC/AC converter 1007*b*.

During a sound operation in which both DC/AC converter 1007 and redundant DC/AC converter 1007*b* are normal, DC/AC converter 1007 and redundant DC/AC converter 1007*b* perform power conversion. Therefore, a sum of output powers from DC/AC converters 1007 and 1007*b* operating in parallel is supplied to propulsion system motor 1001, and the propulsive force can be maintained even when the height increases. As power sharing during the sound operation, for example, in a case where a sum of a power supplied to propulsion system motor 1001 is 1 MW, the output power of each of DC/AC converter 1007 and redundant DC/AC converter 1007*b* is set to 0.5 MW. Alternatively, since DC/AC converter 1007 can be driven with lower loss than redundant DC/AC converter 1007*b* according to a FIT reduction method to be described later, a ratio of the output power of DC/AC converter 1007 may be made higher than a ratio of the output power of redundant DC/AC converter 1007*b*.

However, in a case where DC/AC converter 1007 fails, since DC/AC converter 1007 is disconnected from the power transmission path by opening CB 3000, redundant DC/AC converter 1007*b* supplies the power alone. In a case where the each of DC/AC converter 1007 and redundant DC/AC converter 1007*b* is driven with the output power of 0.5 MW during the sound operation, it is assumed that propulsion system motor 1001 is continuously operated only with the power of 0.5 MW to be output from redundant DC/AC converter 1007*b*. Alternatively, it is assumed that redundant DC/AC converter 1007*b* having a maximum output power of 1 MW is mounted, and propulsion system motor 1001 is continuously operated while the propulsive force is maintained by increasing the output voltage of redundant DC/AC converter 1007*b*.

Note that, in a case where DC/AC converter 1007 and redundant DC/AC converter 1007*b* have the same configuration and the input voltages are equal, failure rates of DC/AC converter 1007 and redundant DC/AC converter 1007*b* attribute to the neutrons are the same.

Figure 33:
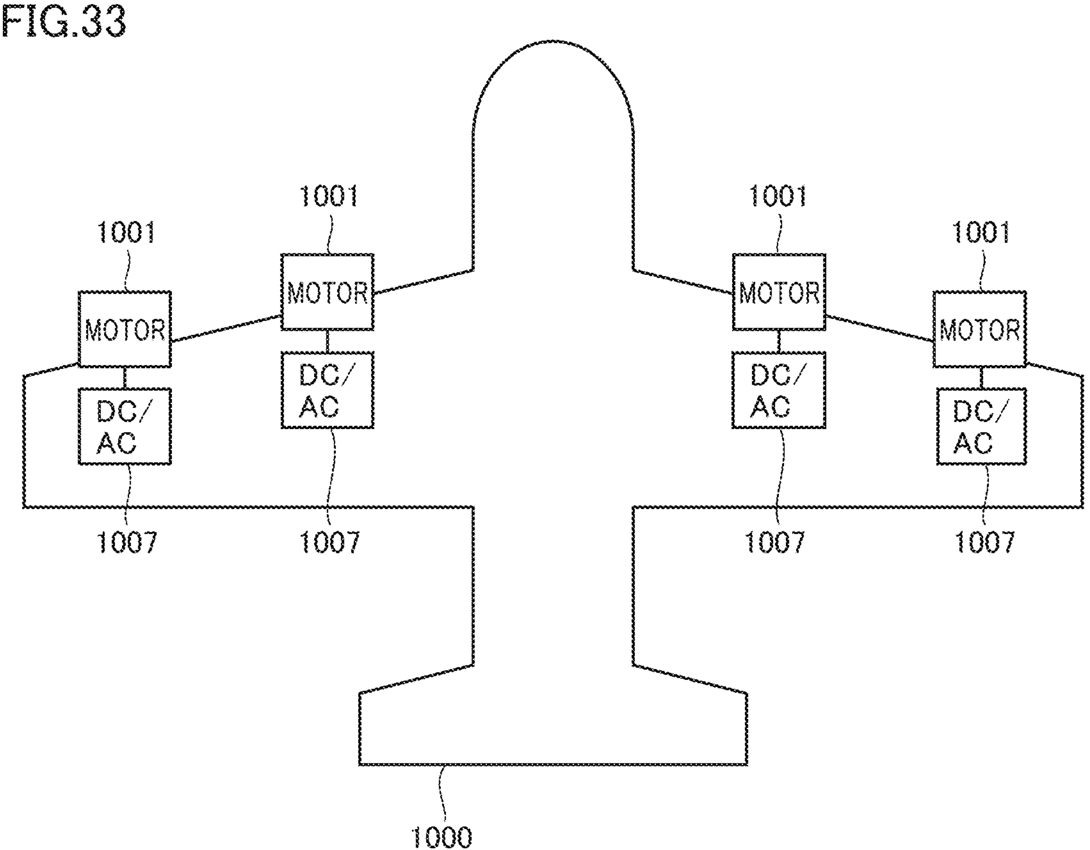
FIG. 33 is a diagram illustrating a configuration example of the aircraft used for prediction.

Here, the number of the power converters that fail within usable years per aircraft is predicted from usable years of the aircraft, the number of the power converters mounted, and the failure rates of the power converters attributable to the neutrons. FIG. 33 is a diagram illustrating a configuration example of the aircraft used for the prediction. For example, it is assumed that usable years per aircraft is 10 years, that is, 24 hours×365 days×10 years=87600 hours. In addition, as illustrated in FIG. 33, the number of DC/AC converters 1007 mounted on one aircraft is four. Further, it is assumed that the failure rate of one DC/AC converter 1007 is 100 FIT. Note that 100 FIT means a probability that 100 DC/AC converters 1007 may fail during the ninth power of ten hours.

Note that, in order to simplify the calculation, it is assumed that a voltage is applied to four DC/AC converters 1007 within the usable years (87600 hours), and there is no fluctuation of the FIT attributable to fluctuation of the neutron ratio.

Since the four DC/AC converters 1007 are mounted on one aircraft, the probability that DC/AC converters 1007 may fail in one aircraft is 400 FIT. Accordingly, the number of DC/AC converters 1007 that fail within the usable years (10 years) is 400 FIT/the ninth power of ten hours×87600 hours=0.035. In other words, the number of DC/AC converters 1007 that fail in the 10 years is less than 1.

Considering only one aircraft in this way, it seems that there is no problem in reliability even when the failure rates of DC/AC converters 1007 attributable to the neutrons is 100 FIT. However, for example, in a case where there are 1000 same aircraft, the number of the DC/AC converters 1007 failed becomes 0.035×1000=35 per 1000 aircraft, and the number of DC/AC converters 1007 failed increases in the 10 years. Accordingly, with an increase in the number of the aircraft on the market, even when it is safe per aircraft, a likelihood that DC/AC converters 1007 may fail in terms of the total number of the aircraft.

Note that, in the aircraft illustrated in FIG. 33, even if one of the four DC/AC converters 1007 fails, the propulsive force of the entire aircraft decreases, and thus it may be difficult for the aircraft to operate. Accordingly, in order to lower the likelihood that DC/AC converters 1007 may fail, it is necessary to reduce the FIT of DC/AC converters 1007 or to apply the redundant configuration to each of DC/AC converters 1007 as illustrated in FIG. 32.

Figure 34:
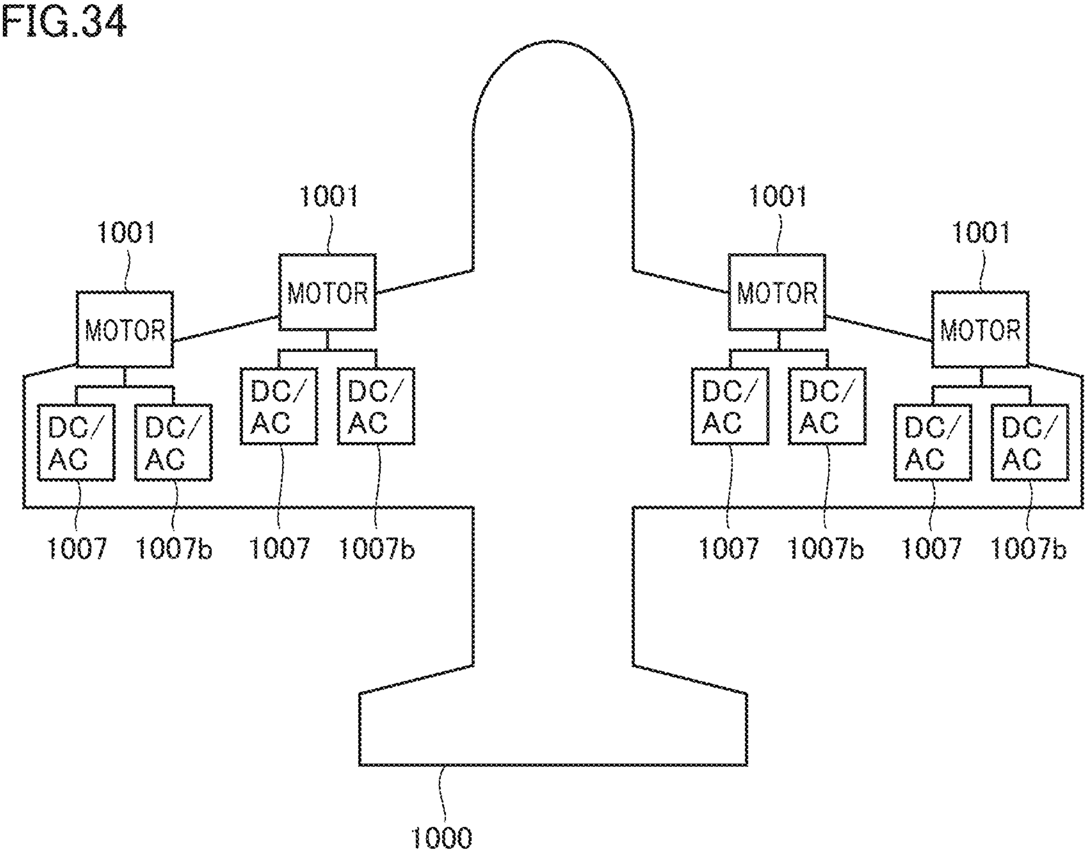
FIG. 34 is a diagram illustrating a configuration example of the aircraft in which the redundant configuration is applied to the power converter.

FIG. 34 is the diagram illustrating a configuration example of the aircraft in which the redundant configuration is applied to the power converter. The configuration example illustrated in FIG. 34 is different from the configuration example illustrated in FIG. 32 in that a redundant configuration in which two DC/AD converters 1007 and 1007*b* are arranged in parallel is applied to each of the four DC/AC converters 1007.

In this redundant configuration, first, it is considered that DC/AC converters 1007 and redundant DC/AC converters 1007*b* have the same configurations, the input voltages are equal between DC/AC converters 1007 and 1007*b*, and the failure rates attributable to the neutrons are equal.

As illustrated in FIG. 34, in a case where the four DC/AC converters 1007 and four redundant DC/AC converters 1007*b* are mounted on one aircraft, eight DC/AC converters 1007 are substantially mounted on the one aircraft. Accordingly, similarly to the aircraft illustrated in FIG. 33, assuming that the failure rates of DC/AC converters 1007 per aircraft is 100 FIT, the number of DC/AC converters 1007 failed is 0.035×1000×2=70 per 1000 aircraft in a case where there are 1000 aircraft. That is, by applying the redundant configuration to DC/DC converters, the number of the DC/AC converters that fail in the 10 years increases.

In fact, it is conceivable that there is a low probability that an event may occur while the aircraft is in flight in which both the DC/AC converters 1007 and the redundant DC/AC converters 1007*b* arranged in parallel with respect to one propulsion system motor 1001 fail, and the power supply to propulsion system motor 1001 is stopped. However, a likelihood that such event may occur is not necessarily 0.

Therefore, in the present embodiment, redundant DC/AC converters 1007*b* are designed to have failure rates lower than DC/AC converters 1007. Accordingly, both DC/AC converters 1007 and redundant DC/AC converters 1007*b* arranged in parallel are less likely to fail while the aircraft is in flight.

For example, in the aircraft illustrated in FIG. 34, in a case where the failure rates of DC/AC converters 1007 are 100 FIT and the failure rates of redundant DC/AC converters 1007*b* are 1 FIT, the number of redundant DC/AC converters 1007*b* that fail within the usable years (the 10 years) is 0.00035×1000=0.35 per 1000 aircraft. In other words, the number of redundant DC/AC converters 1007*b* mounted on aircraft 1000 is less than one. Accordingly, both DC/AC converters 1007 and redundant DC/AC converters 1007*b* may be infinitely less likely to fail while the aircraft is in flight.

Next, a method of making the failure rate of the redundant DC/AC converter 1007*b* lower than the failure rate of DC/AC converter 1007 will be described. As the method of reducing the failure rate of redundant DC/AC converter 1007*b*, four methods as described below are conceivable. However, in any of the methods, there is a trade-off with the failure rate, and thus there may be a disadvantage by reducing the failure rate.

(1) First Method

A first method of reducing the failure rate of redundant DC/AC converter 1007*b* is to make an input voltage of redundant DC/AC converter 1007*b* lower than the input voltage of DC/AC converter 1007. The first method utilizes FIT curve 38 of second semiconductor element 10 in which the FIT decreases as the applied voltage decreases (see FIG. 20).

According to the first method, even when redundant DC/AC converter 1007*b* and DC/AC converter 1007 have the same configuration and the same failure rate with respect to the neutron ratio, the failure rate of redundant DC/AC converter 1007*b* can be made lower than the failure rate of DC/AC converter 1007. However, since the output voltage of redundant DC/AC converter 1007*b* also decreases by lowering the input voltage, the torque of propulsion system motor 1001 may decrease during an isolated operation of redundant DC/AC converter 1007*b*. There is a concern that the propulsive force of the aircraft decreases due to this decrease in the torque.

(2) Second Method

A second method of reducing the failure rate of redundant DC/AC converter 1007*b* is to make second semiconductor element 10 used in redundant DC/AC converter 1007*b* an element having a higher withstand voltage than second semiconductor element 10 used in DC/AD converter 100. The second method utilizes a fact that the FIT against the same applied voltage decreases as the withstand voltage of the semiconductor element increases (see FIG. 22).

However, according to the second method, there is a concern that the input voltages of redundant DC/AC converter 1007*b* and DC/AC converter 1007 can be made equal, while on-resistance of second semiconductor element 10 is increased by increasing the withstand voltage, which may lead to an increase in power loss in second semiconductor element 10. Due to the power loss increased in redundant DC/AC converter 1007*b*, an amount of heat generated in the aircraft increases. Increasing a cooling capability of redundant DC/AC converter 1007*b* may lead to an increase in a size and a weight of redundant DC/AC converter 1007*b*. In addition, there is a concern that the increase in the weight of redundant DC/AC converter 1007*b* may cause deterioration in fuel consumption of the aircraft.

(3) Third Method

A third method of reducing the failure rate of redundant DC/AC converter 1007*b* is to make the number of second semiconductor elements 10 mounted on redundant DC/AC converter 1007*b* smaller than the number of second semiconductor elements 10 mounted on DC/AD converter 1007. The third method utilizes a fact that the FIT for the same applied voltage decreases as the number of the semiconductor elements mounted decreases (see FIG. 23). For example, the number of second power semiconductor modules 14 mounted on redundant DC/AC converter 1007*b* is made smaller than the number of second power semiconductor modules 14 mounted on DC/AC converter 1007. Alternatively or additionally, the number of second semiconductor elements 10 mounted on the each of second power semiconductor modules 14 of redundant DC/AC converter 1007*b* is made smaller than the number of second semiconductor elements 10 mounted on the each of second power semiconductor modules 14 of DC/AC converter 1007.

However, according to the third method, since the number of second semiconductor elements 10 constituting each of arms of redundant DC/AC converter 1007*b* decreases, on-resistance of the each of the arms increases, which may lead to the increase in the power loss. As in the second method described above, the increase in the power loss in redundant DC/AC converter 1007*b* may lead to the increase in the size and the weight of redundant DC/AC converter 1007*b* to ensure the cooling capability. In addition, there is a concern that the increase in the weight of redundant DC/AC converter 1007*b* may cause deterioration in fuel consumption of the aircraft.

(4) Fourth Method

A fourth method of reducing the failure rate of redundant DC/AC converter 1007*b* is to make a temperature of second semiconductor element 10 mounted on redundant DC/AC converter 1007*b* higher than the temperature of second semiconductor element 10 mounted on DC/AD converter 1007. The fourth method utilizes a fact that the FIT for the same applied voltage decreases as the temperature (the junction temperature) of the semiconductor element increases (see FIG. 22).

However, according to the fourth method, the temperature of second semiconductor element 10 mounted on redundant DC/AC converter 1007*b* is required to be maintained higher than the temperature of second semiconductor element 10 mounted on DC/AC converter 1007. This is advantageous for the failures attributable to the neutrons but disadvantageous for mechanical failures.

Each of the first to fourth methods described above has a disadvantage. Therefore, in the present embodiment, in the redundant configuration, DC/AC converter 1007 is designed mainly for efficient and low-loss power supply to propulsion system motor 1001, and redundant DC/AC converter 1007*b* is designed mainly for maintaining a low failure rate while supplying the power to propulsion system motor 1001. With such configuration, an efficient and highly reliable power converter is achieved.

Next, a specific configuration of the power system for implementing the first to fourth methods described above will be described.

(1) Configuration Example of First Method

Figure 35:
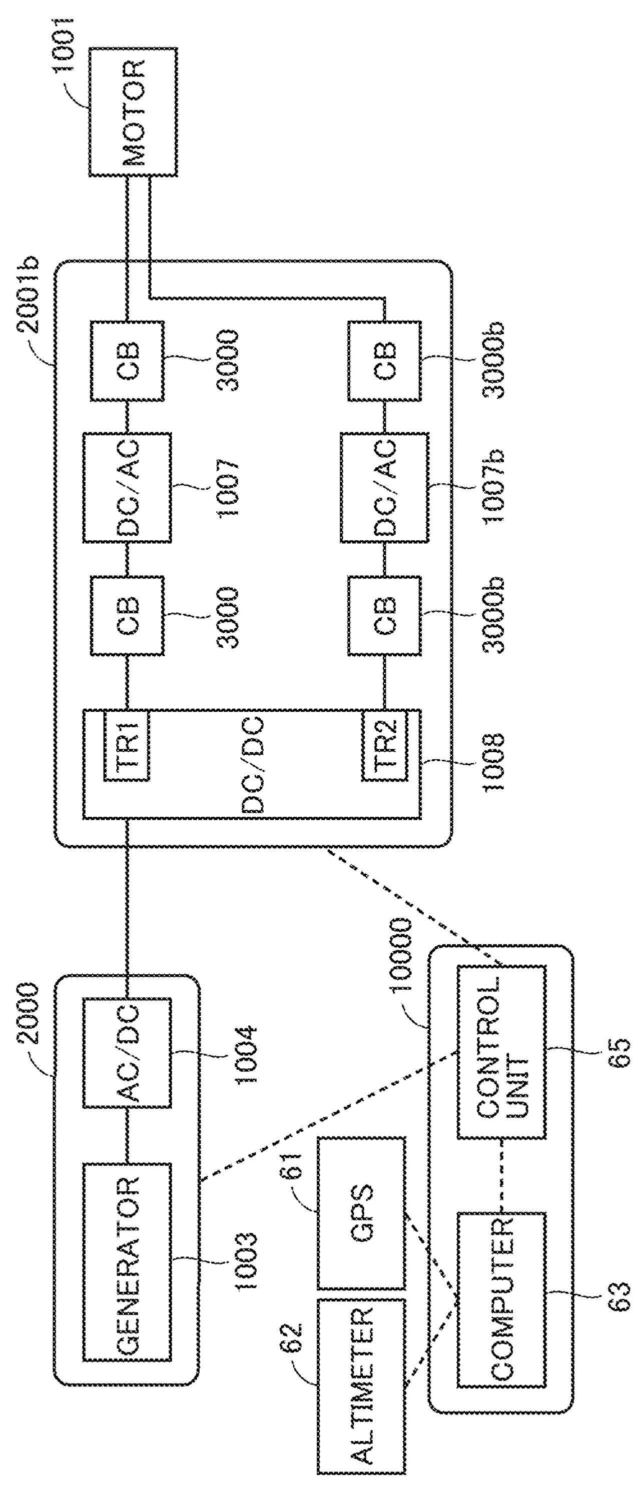
FIG. 35 is a diagram illustrating a first configuration example of the power system for implementing a first method.

FIG. 35 is a diagram illustrating a first configuration example of the power system for implementing the first method. The configuration example of the power system illustrated in FIG. 35 has the same basic configuration as the first configuration example illustrated in FIG. 31, but a configuration of propulsion system 2001*b* is different.

In propulsion system 2001*b* illustrated in FIG. 35, DC/DC converter 1008 is configured to be able to generate two output voltages that differ from each other. For example, DC/DC converter 1008 is configured to include non-insulated step-down chopper circuit 5000 (see FIG. 7), a first output transformer TR1, and a second output transformer TR2.

First output transformer TR1 is disposed between the CB 3000, and output positive bus 5*p* and output negative bus 5*n* of non-insulated step-down chopper circuit 5000. First output transformer TR1 generates an output voltage Vou1 from output voltage Vout of non-insulated step-down chopper circuit 5000, and outputs output voltage Vou1 to DC/AC converter 1007. Second output transformer TR2 generates an output voltage Vou2 from output voltage Vout of non-insulated step-down chopper circuit 5000, and outputs output voltage Vou2 to redundant DC/AC converter 1007*b*. Note that Vout2<Vout1. Accordingly, the input voltage of redundant DC/AC converter 1007*b* can be made lower than the input voltage of DC/AC converter 1007.

Figure 36:
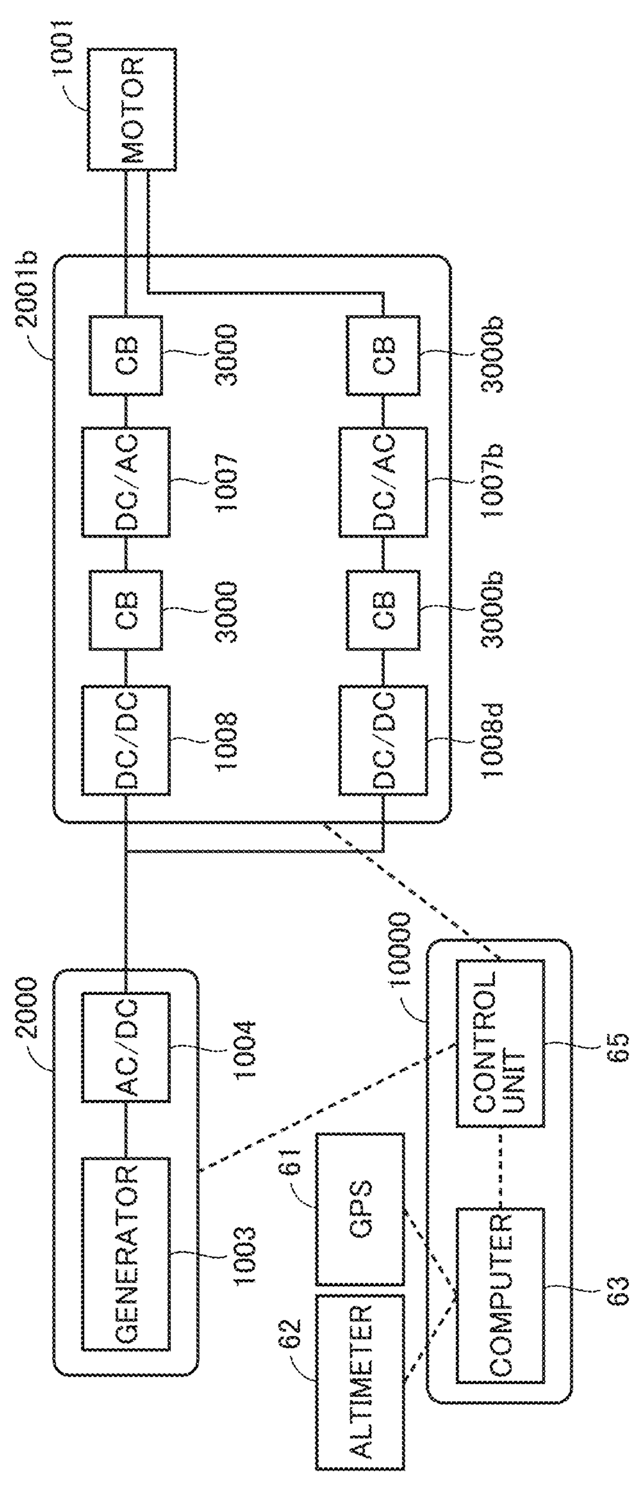
FIG. 36 is a diagram illustrating a second configuration example of the power system for implementing the first method.

FIG. 36 is a diagram illustrating a second configuration example of the power system for implementing the first method. The configuration example of the power system illustrated in FIG. 36 has the same basic configuration as the first configuration example illustrated in FIG. 31, but the configuration of propulsion system 2001*b* is different.

Propulsion system 2001*b* illustrated in FIG. 36 is different from propulsion system 2001*b* illustrated in FIG. 31 in including two DC/DC converters 1008 and 1008*d*. DC/DC converter 1008 is configured to receive the DC voltage to be supplied from power source 2000, and control the input voltage to DC/AC converter 1007. DC/AC converter 1007 converts the transformed DC voltage into an AC voltage, and supplies the converted AC voltage to propulsion system motor 1001. DC/DC converter 1008*d* is configured to receive the DC voltage to be supplied from power source 2000, and control an input voltage to redundant DC/AC converter 1007*b*. Redundant DC/AC converter 1007*b* converts the transformed DC voltage into the AC voltage, and supplies the converted AC voltage to propulsion system motor 1001.

Note that, in the configuration examples illustrated in FIGS. 35 and 36, if the output node of DC/AC converter 1007 and the output node of redundant DC/AC converter 1007*b* are connected, a potential of the output node of redundant DC/AC converter 1007*b* is raised to a potential of the output node of DC/AC converter 1007, and thus, malfunction of redundant DC/AC converter 1007*b* may occur. Therefore, propulsion system motor 1001 includes a double-winding type motor having two sets of windings, the output node of DC/AC converter 1007 is connected to a first set of windings, and the output node of redundant DC/AC converter 1007*b* is connected to a second set of windings. Note that since the output voltage of redundant DC/AC converter 1007*b* is lower than the output voltage of DC/AC converter 1007, a torque of the double-winding type motor may be secured by reducing a winding impedance of the double-winding type motor to which redundant DC/AC converter 1007*b* is connected so that the large current can be passed.

Figure 37:
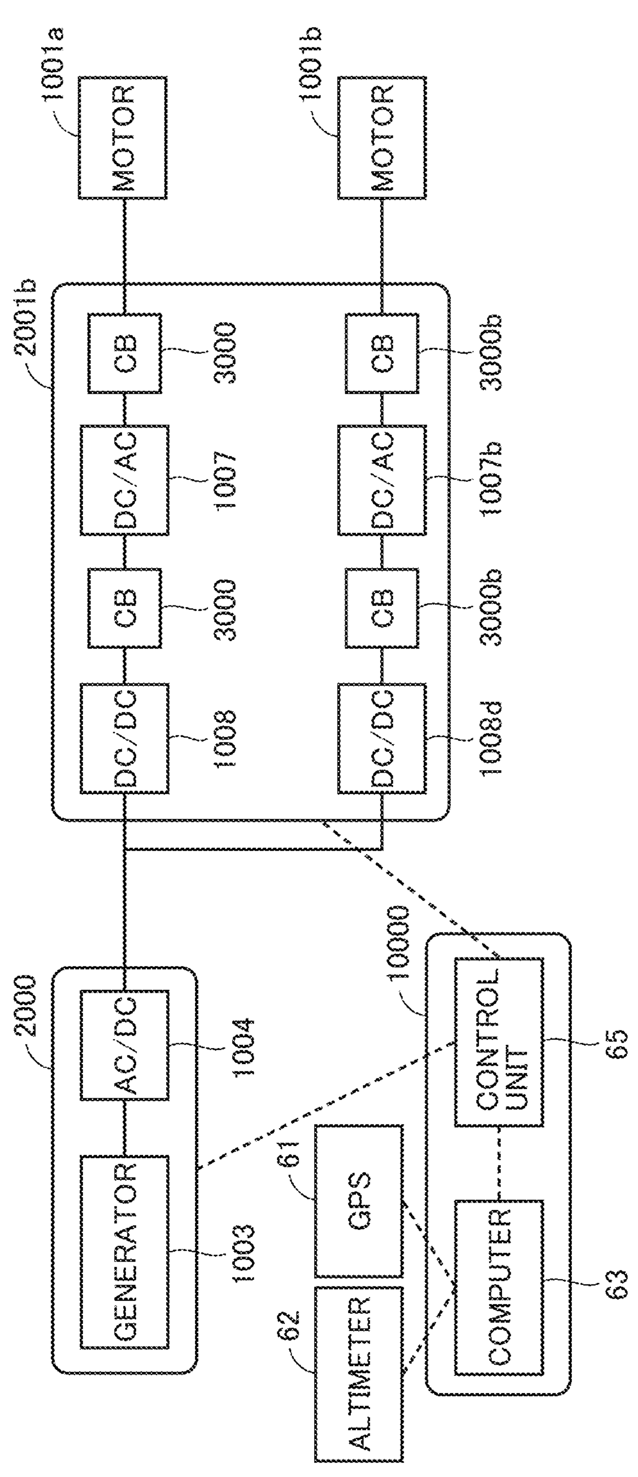
FIG. 37 is a diagram illustrating a third configuration example of the power system for implementing the first method.

Alternatively, as illustrated in FIG. 37, propulsion system motor 1001 may be divided into two propulsion system motors 1001*a* and 1001*b*. FIG. 37 is a diagram illustrating a third configuration example of the power system for implementing the first method. The configuration example of the power system illustrated in FIG. 37 has the same basic configuration as the configuration example illustrated in FIG. 36, but is different in including two propulsion system motors 1001*a* and 1001*b*.

As illustrated in FIG. 37, DC/AC converter 1007 is connected to propulsion system motor 1001*a* via CB 3000. The propulsion system motor 1001*a* is driven by the power supplied from DC/AC converter 1007. Redundant DC/AC converter 1007*b* is connected to propulsion system motor 1001*b* via CB 3000*b*. Propulsion system motor 1001*b* is driven by the power supplied from redundant DC/AC converter 1007*b*. Propulsion system motor 1001*b* may be designed to be different from propulsion system motor 1001*a* and suitable for the output voltage and an output current of redundant DC/AC converter 1007*b*.

(2) Configuration Example of Second Method

The second method can be implemented by using, in redundant DC/AC converter 1007*b*, a third semiconductor element 10*c* having a higher withstand voltage than second semiconductor element 10 mounted on DC/AC converter 1007.

Specifically, in a case where the each of DC/AC converter 1007 and redundant DC/AC converter **1007*b* includes three-phase two-level inverter circuit 5001*b* (see FIG. 14), each of a plurality of second power semiconductor modules 14 included in redundant DC/AC converter 1007*b* is configured by using a plurality of third semiconductor elements 10*c***.

In this case, a FIT curve of third semiconductor element **10*c* becomes second FIT curve 40 illustrated in FIG. 21, and the FIT for the same applied voltage becomes smaller than that of first FIT curve 38 of second semiconductor element 10. Accordingly, the failure rate of redundant DC/AC converter 1007*b* can be made lower than the failure rate of DC/AC converter 1007. In addition, it is not necessary to divide the output voltage of DC/DC converter 1008 or to add DC/DC converter 1008*d* as illustrated in FIGS. 34 and 35**.

(3) Configuration Example of Third Method

The third method is to make the number of second semiconductor elements 10 mounted on redundant DC/AC converter **1007*b* smaller than the number of second semiconductor elements 10 mounted on DC/AD converter 1007. Specifically, each of a plurality of arms in DC/AC converter 1007 is configured by connecting N second semiconductor elements 10 in parallel, and each of the plurality of arms in redundant DC/AC converter 1007*b* is configured by connecting M second semiconductor elements 10** in parallel. Then, in the above configuration, N is an integer of greater than or equal to 2, and M is an integer of greater than or equal to 1 and less than N.

For example, in the case where the each of DC/AC converter 1007 and redundant DC/AC converter **1007*b* includes three-phase two-level inverter circuit 5001*b* (see FIG. 14), in redundant DC/AC converter 1007*b*, the number of second semiconductor elements 10 included in second power semiconductor module 14** constituting each phase arm is reduced from 2 to 1.

In this case, a FIT curve of redundant DC/AC converter **1007*b* has a smaller FIT for the same applied voltage than a FIT curve of DC/AC converter 1007. Accordingly, the failure rate of redundant DC/AC converter 1007*b* can be made lower than the failure rate of DC/AC converter 1007. In addition, it is not necessary to divide the output voltage of DC/DC converter 1008 or to add DC/DC converter 1008*d* as illustrated in FIGS. 34 and 35**.

(4) Configuration Example of Fourth Method

The fourth method can be implemented by making the junction temperature of second semiconductor element 10 mounted on redundant DC/AC converter **1007*b* higher than the junction temperature of second semiconductor element 10 mounted on DC/AD converter 1007**.

Specifically, in the case where the each of DC/AC converter 1007 and redundant DC/AC converter **1007*b* includes three-phase two-level inverter circuit 5001*b* (see FIG. 14), cooling performance of the cooling device that cools redundant DC/AC converter 1007*b* is lower than the cooling performance of the cooling device that cools DC/AC converter 1007. For example, in a case where the each of DC/AC converter 1007 and redundant DC/AC converter 1007*b* includes water-cooling device 23*a* (see FIG. 16), the cooling performance can be varied by varying an amount or a temperature of a refrigerant flowing through cooling pipe 23*b* between DC/AC converter 1007 and redundant DC/AC converter 1007*b***.

Alternatively, the fourth method can be implemented by making a gate voltage of second semiconductor element 10 mounted on three-phase two-level inverter circuit **5001*b* of redundant DC/AC converter 1007*b* lower than the gate voltage of second semiconductor element 10 mounted on three-phase two-level inverter circuit 5001*b* of DC/AC converter 1007. Since the on-resistance of second semiconductor element 10 increases by lowering the gate voltage of second semiconductor element 10, the power loss occurring in redundant DC/AC converter 1007*b*** can be increased.

Note that the first to fourth methods described above can be appropriately combined within a range in which no inconvenience or contradiction arises in addition to combinations without being mentioned in the description.

<Other Configuration Examples>

The configuration examples illustrated in FIGS. 35 and 36 are not limited to propulsion system **2001*b*, and can also be applied to electrical component systems 2002 to 2004**.

Figure 38:
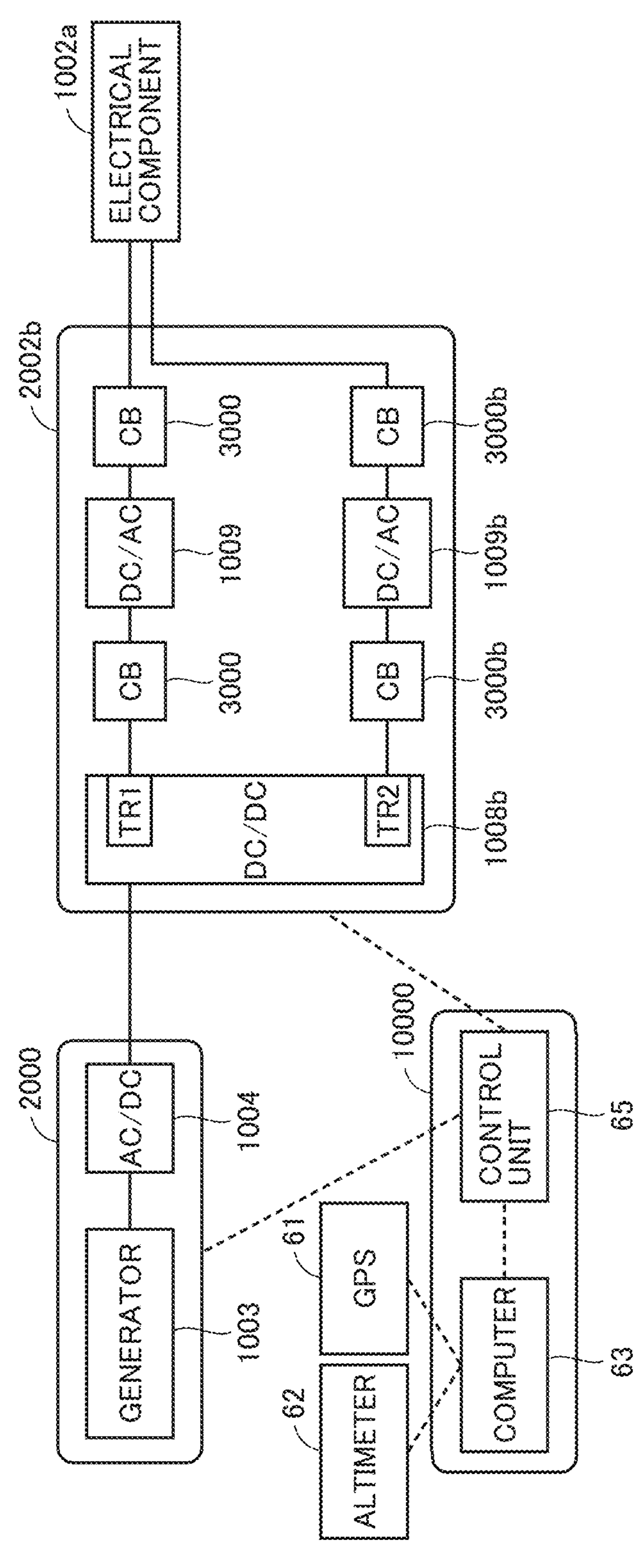
FIG. 38 is a diagram illustrating a fourth configuration example of the power system for implementing the first method.

FIG. 38 is a diagram illustrating a fourth configuration example of the power system for implementing the first method. In the configuration example of the power system illustrated in FIG. 38, propulsion system **2001*b* in the configuration example illustrated in FIG. 35 is replaced with an electrical component system 2002*b***.

Electrical component system **2002*b* illustrated in FIG. 38 is different from propulsion system 2001*b* illustrated in FIG. 35 in including DC/AC converter 1009 and a redundant DC/AC converter 1009*b* instead of DC/AC converter 1007 and redundant DC/AC converter 1007*b*, as well as DC/DC converter 1008*b* instead of DC/DC converter 1008**.

DC/DC converter **1008*b* has a similar configuration to DC/DC converter 1008, and is configured to be able to generate two output voltages that differ from each other. Accordingly, also in electrical component system 2002*b*, an input voltage of redundant DC/AC converter 1009*b* can be made lower than the input voltage of DC/AC converter 1009 as in propulsion system 2001*b*. Accordingly, even when redundant DC/AC converter 1009*b* and DC/AC converter 1009 have the same configuration and the same failure rate with respect to the neutron ratio, the failure rate of redundant DC/AC converter 1009*b* can be made lower than the failure rate of DC/AC converter 1009**.

Figure 39:
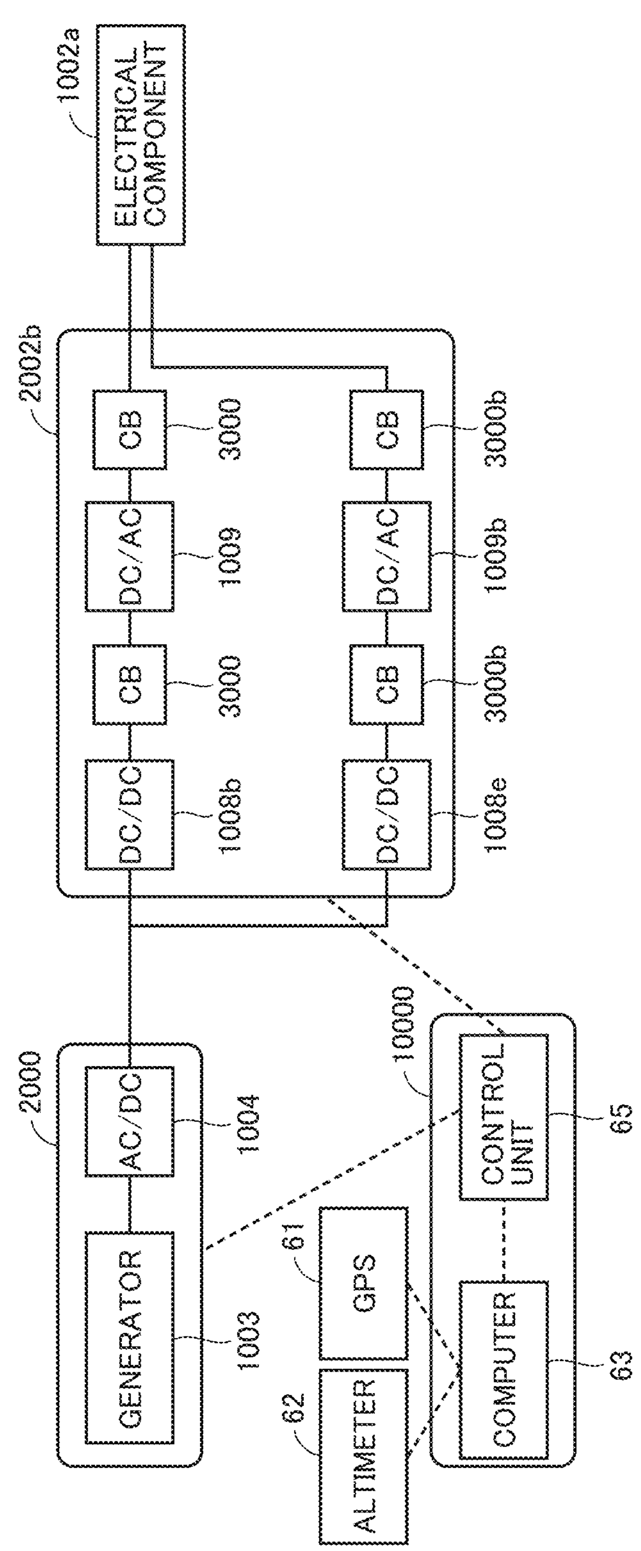
FIG. 39 is a diagram illustrating a fifth configuration example of the power system for implementing the first method.

FIG. 39 is a diagram illustrating a fifth configuration example of the power system for implementing the first method. In the configuration example of the power system illustrated in FIG. 39, propulsion system **2001*b* in the configuration example illustrated in FIG. 36 is replaced with electrical component system 2002*b***.

Electrical component system **2002*b* illustrated in FIG. 39 is different from propulsion system 2001*b* illustrated in FIG. 36 in including DC/AC converter 1009 and redundant DC/AC converter 1009*b* instead of DC/AC converter 1007 and redundant DC/AC converter 1007*b*, as well as DC/DC converters 1008*b* and 1008*e* instead of DC/DC converters 1008 and 1008*d***.

DC/DC converter **1008*b* is configured to receive the DC voltage to be supplied from power source 2000, and control the input voltage to DC/AC converter 1009. DC/DC converter 1008*e* is configured to receive the DC voltage to be supplied from power source 2000, and control an input voltage to redundant DC/AC converter 1009*b*. Accordingly, also in electrical component system 2002*b*, an input voltage of redundant DC/AC converter 1009*b* can be made lower than the input voltage of DC/AC converter 1009 as in propulsion system 2001*b***.

Figure 40:
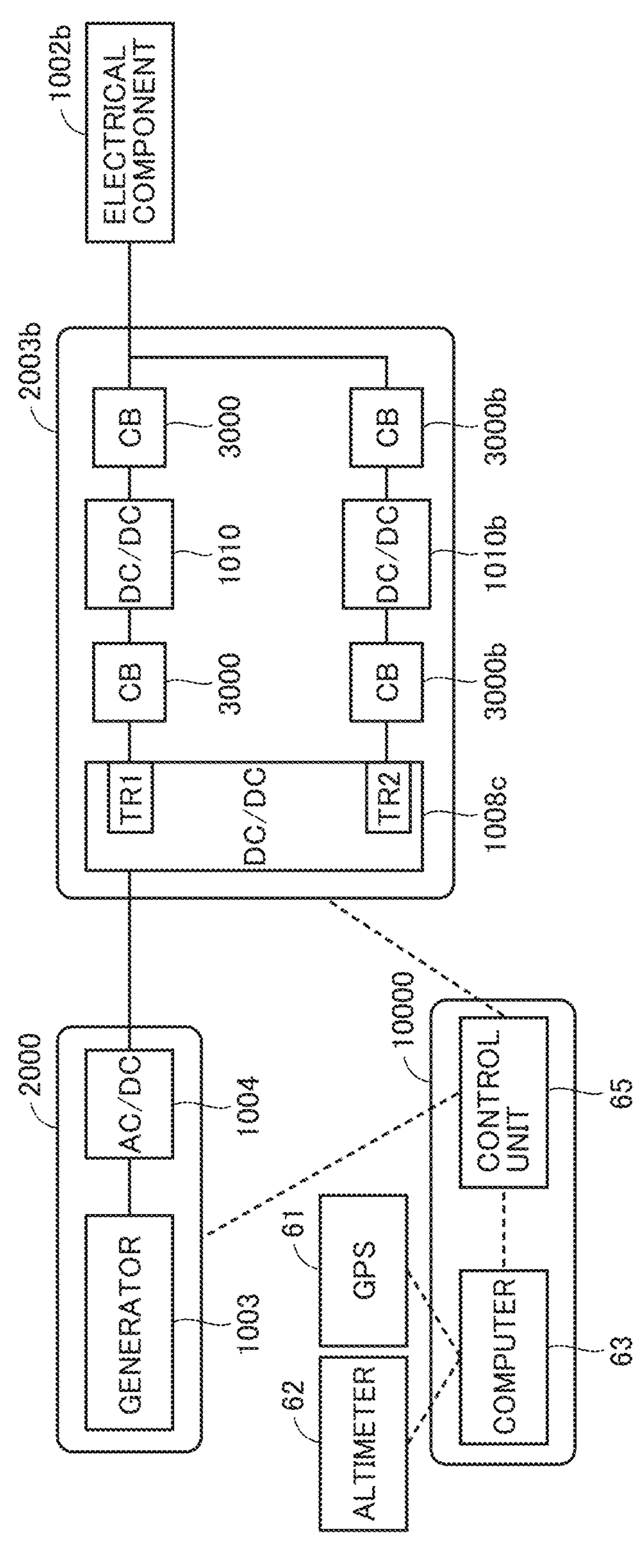
FIG. 40 is a diagram illustrating a sixth configuration example of the power system for implementing the first method.

FIG. 40 is a diagram illustrating a sixth configuration example of the power system for implementing the first method. In the configuration example of the power system illustrated in FIG. 40, propulsion system 2001*b* in the configuration example illustrated in FIG. 35 is replaced with an electrical component system 2003*b*.

Electrical component system 2003*b* illustrated in FIG. 40 is different from propulsion system 2001*b* illustrated in FIG. 35 in including DC/DC converter 1010 and a redundant DC/DC converter 1010*b* instead of DC/AC converter 1007 and redundant DC/AC converter 1007*b*, as well as DC/DC converter 1008*c* instead of DC/DC converter 1008.

DC/DC converter 1008*c* has a similar configuration to DC/DC converter 1008, and is configured to be able to generate two output voltages that differ from each other. Accordingly, also in electrical component system 2003*b*, an input voltage of redundant DC/DC converter 1010*b* can be made lower than the input voltage of DC/DC converter 1010 as in propulsion system 2001*b*. Accordingly, even when redundant DC/DC converter 1010*b* and DC/DC converter 1010 have the same configuration and the same failure rate with respect to the neutron ratio, the failure rate of redundant DC/DC converter 1010*b* can be made lower than the failure rate of DC/DC converter 1010.

Figure 41:
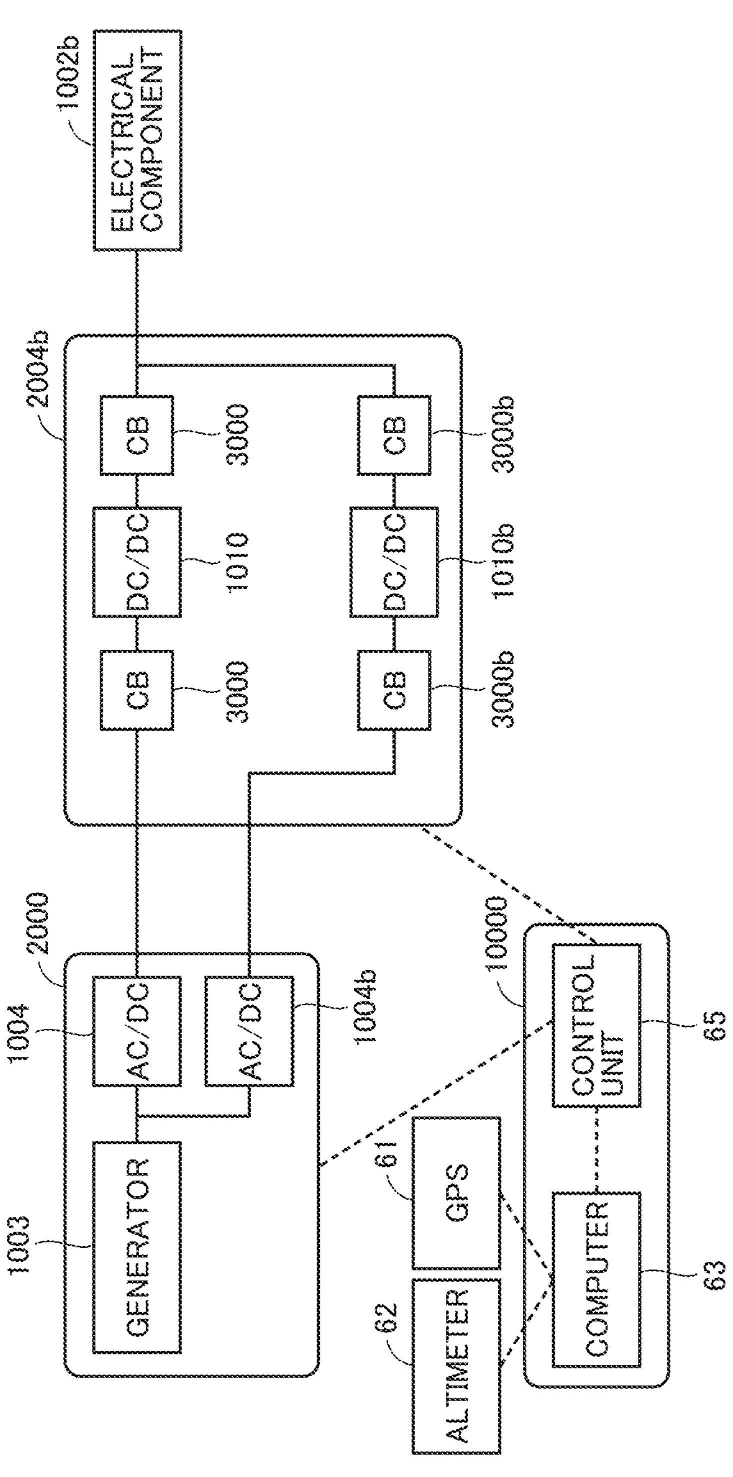
FIG. 41 is a diagram illustrating a seventh configuration example of the power system for implementing the first method.

FIG. 41 is a diagram illustrating a seventh configuration example of the power system for implementing the first method. In the configuration example of the power system illustrated in FIG. 41, propulsion system 2001*b* in the configuration example illustrated in FIG. 35 is replaced with an electrical component system 2004*b*. In addition, the configuration example of the power system illustrated in FIG. 41 is different from the configuration example illustrated in FIG. 35 in the configuration of power source 2000.

As illustrated in FIG. 41, power source 2000 includes generator 1003 and two AC/DC converters 1004 and 1004*b*. Generator 1003 generates an AC voltage. AC/DC converters 1004 and 1004*b* convert an AC voltage generated by generator 1003 into a DC voltage, and supply the DC voltage to electrical component system 2004*b*.

Electrical component system 2004*b* includes DC/DC converter 1010, redundant DC/DC converter 1010*b*, CB 3000, and a CB 300*b*. CB 3000 is arranged between an output node of AC/DC converter 1004 and an input node of DC/DC converter 1010. CB 3000 is arranged between an output node of DC/DC converter 1007 and electrical component 1002*b*. CB 3000*b* is arranged between an output node of AC/DC converter 1004*b* and an input node of redundant DC/DC converter 1010*b*. CB 3000*b* is arranged between an output node of redundant DC/DC converter 1010*b* and electrical component 1002*b*.

AC/DC converter 1004*b* is configured to receive an AC voltage to be supplied from generator 1003 to control the input voltage to DC/DC converter 1010. AC/DC converter 1004*b* is configured to receive the AC voltage to be supplied from generator 1003 to control an input voltage to redundant DC/DC converter 1010*b*. Accordingly, also in electrical component system 2004*b*, the input voltage of redundant DC/DC converter 1010*b* can be made lower than the input voltage of DC/DC converter 1010 as in propulsion system 2001*b*.

As described above, with the power conversion device according to the first embodiment, the each of the power converters has a redundant configuration in which the first power converter and the second power converter are arranged in parallel, and the failure rate of the second power converter for redundancy with respect to the first power converter is made lower than the failure rate of the first power converter, whereby a likelihood that the each of the power converters fails during operation of the power conversion device can be reduced.

Second Embodiment

In the first embodiment described above, a configuration in which a redundant configuration in which the two DC/AC converters 1007 and 1007*b* are arranged in parallel is applied to DC/AC converter 1007 of propulsion system 2001 has been described.

However, in propulsion system 2001*b* illustrated in FIG. 35, in a case where DC/DC converter 1008 fails before DC/AC converters 1007 and 1007*b*, the voltage is not supplied to DC/AC converters 1007 and 1007*b*.

Therefore, the failure rate of DC/DC converter 1008 is designed to be lower than the failure rates of DC/AC converters 1007 and 1007*b*. Accordingly, reliability of propulsion system 2001*b* can be further improved.

Note that the first to fourth methods described in the first embodiment can be applied to a method of reducing the failure rate of DC/DC converter 1008.

Third Embodiment

In the first embodiment described above, the configuration in which the redundant configuration in which the two DC/AC converters 1007 and 1007*b* are arranged in parallel is applied to DC/AC converter 1007 of propulsion system 2001 has been described. However, the redundant configuration can also be applied to DC/DC converter 1008.

Figure 42:
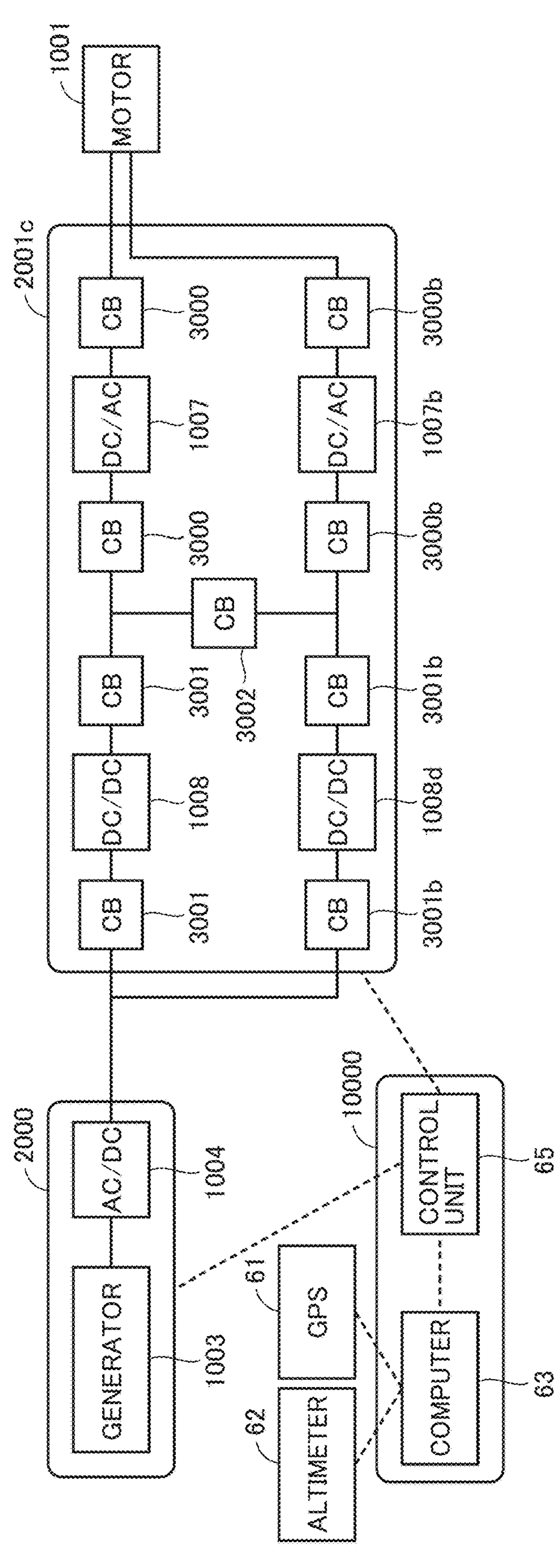
FIG. 42 is a diagram illustrating a configuration example of a power system according to a third embodiment.

FIG. 42 is a diagram illustrating a configuration example of a power system according to a third embodiment. In the configuration example of the power system illustrated in FIG. 42, propulsion system 2001*b* in the configuration example illustrated in FIG. 35 is replaced with a propulsion system 2001*c*.

Propulsion system 2001*c* has the same basic configuration as propulsion system 2001*b*, but is different in including redundant DC/DC converter 1008*d* and circuit breakers 3001, 3001*b*, and 3002.

Redundant DC/DC converter 1008*d* is connected to the output node of AC/DC converter 1004 in parallel with DC/DC converter 1008. DC/AC converter 1007*b* constitutes a redundant DC/AC converter for DC/AC converter 1007. In other words, propulsion system 2001*c* has a redundant configuration in which two DC/DC converters 1008 and 1008*b* are arranged in parallel.

CB 3001 is arranged between the output node of AC/DC converter 1004 and an input node of DC/DC converter 1008. CB 3001 is arranged in series with CB 3000 between an output node of DC/DC converter 1008 and an input node of DC/DC converter 1007.

CB 3001*b* is arranged between the output node of AC/DC converter 1004 and an input node of redundant DC/DC converter 1008*d*. CB 3001*b* is arranged in series with CB 3000*b* between an output node of redundant DC/DC converter 1008*d* and an input node of redundant DC/AC converter 1007*b*.

CB 3002 is connected between a connection node of CB 3001 and CB 3000, and a connection node of CB 3001*b* and CB 3000*b*.

In the configuration example illustrated in FIG. 41, DC/DC converter 1008 and redundant DC/DC converter 1008*d* execute voltage conversion in a state where CBs 3001 and 3001*b* are closed and CB 3002 is opened during sound operation in which both DC/DC converter 1008 and redundant DC/DC converter 1008*d* are normal. In a case where DC/DC converter 1008 fails, DC/DC converter 1008 is disconnected from the power transmission path by opening CBs 3001 and 3002. Accordingly, redundant DC/DC converter 1008*d* supplies a voltage to DC/AC converters 1007 and 1007*b*.

Also in the present embodiment, by designing redundant DC/DC converter 1008*d* to have a failure rate lower than DC/DC converter 1008, it is possible to reduce a likelihood that both DC/DC converter 1008 and redundant DC/DC converter 1008*d* arranged in parallel fail while the aircraft is in flight.

Fourth Embodiment

In the first to third embodiments described above, the configuration example in which the power converter for redundancy is one in the power converter having the redundant configuration has been described. However, a plurality of power converters for redundancy may be disposed.

Figure 43:
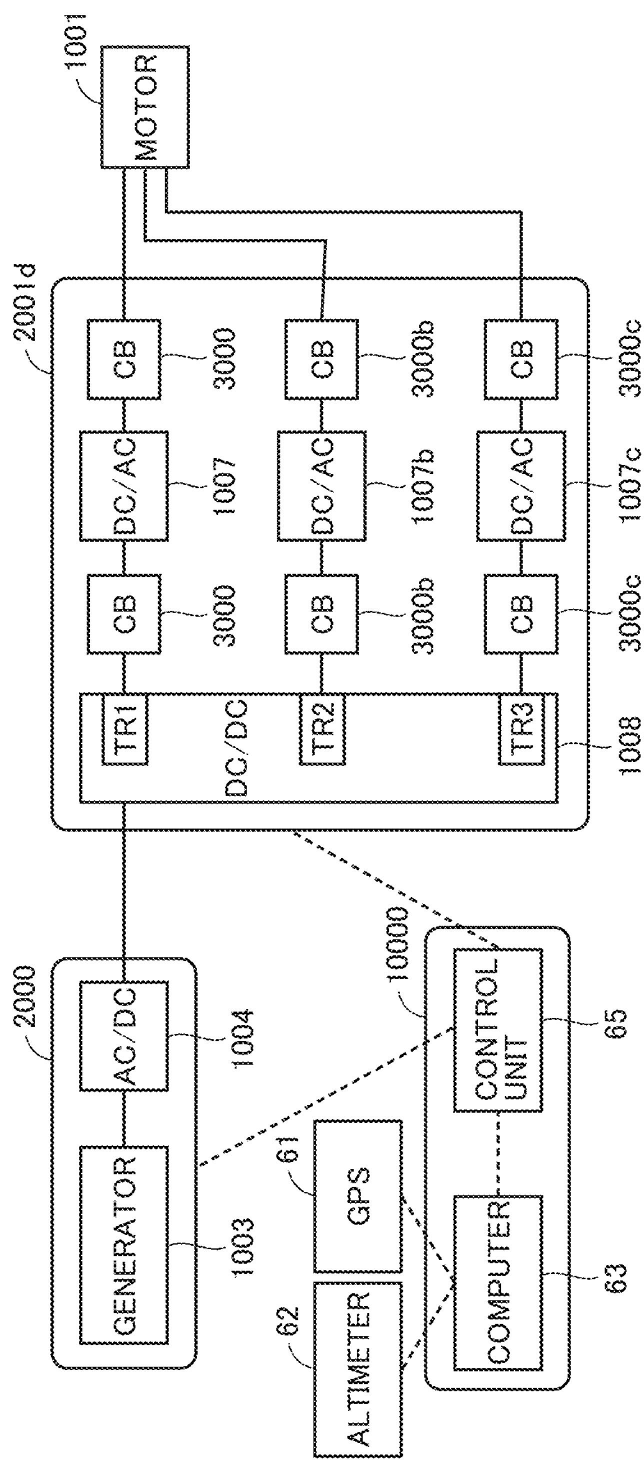
FIG. 43 is a diagram illustrating a configuration example of a power system according to a fourth embodiment.

FIG. 43 is a diagram illustrating a configuration example of the power system according to the third embodiment. In the configuration example of the power system illustrated in FIG. 43, propulsion system 2001*b* in the configuration example illustrated in FIG. 35 is replaced with a propulsion system 2001*d*.

Propulsion system 2001*d* has the same basic configuration as propulsion system 2001*b*, but is different in including two redundant DC/AC converters 1007*b* and 1007*c*.

In the configuration example illustrated in FIG. 43, the failure rates of DC/AC converter 1007 and redundant DC/AC converter 1007*b* are the same, and a failure rate of redundant DC/AC converter 1007*c* can be made lower than those of failure rates of DC/AC converters 1007 and 1007*b*.

Alternatively, the failure rates of redundant DC/AC converters 1007*b* and 1007*c* can be made lower than the failure rate of DC/AC converter 1007.

Alternatively, the failure rates of DC/AC converter 1007, redundant DC/AC converter 1007*b* and redundant DC/AC converter 1007*c* can be designed to be different from each other.

Fifth Embodiment

The junction temperature of second semiconductor element 10 constituting DC/AC converter 1007 also fluctuates depending on the power loss occurring in second semiconductor element 10 and the cooling performance of the cooling device. In the fifth embodiment, a method of acquiring the junction temperature of second semiconductor element 10 will be described.

In a case where second semiconductor element 10 has the element structure illustrated in FIG. 16, in order to monitor heat generation of second semiconductor element 10, a thermocouple 24 can be installed between base plate 16 and water-cooling device 23*a*, and a case temperature Tc can be detected by using thermocouple 24. In this configuration, the junction temperature of second semiconductor element 10 can be estimated from a detection value of case temperature Tc, power supplied to second semiconductor element 10, and thermal resistance from second semiconductor element 10 to base plate 16.

Alternatively, the junction temperature can be estimated by installing a thermistor 25 near second semiconductor element 10 on front electrode 20 and detecting variation of a resistance value of thermistor 25.

Alternatively, the junction temperature can be estimated by installing a temperature sensor 26 including a diode inside second semiconductor element 10 and detecting variation of electrical characteristics of temperature sensor 26.

Alternatively, the junction temperature can be estimated by applying a weak current to second semiconductor element 10 and detecting variation of electrical characteristics due to variation of the temperature.

Alternatively, the junction temperature can be estimated by detecting variation of electrical characteristics of gate resistance of second semiconductor element 10 due to the variation of the temperature.

Alternatively, the temperature of second semiconductor element 10 can be estimated on the basis of a detection value of a temperature of a housing of DC/AC converter 1007.

Sixth Embodiment

In the first to fifth embodiments described above, a case where the neutrons are taken as the cosmic rays and the SEB occurs due to the collision of the neutrons has been described. However, the SEB can also occur in a case where heavy particles with high energy, protons, or the like collide. Further, an influence of a case where muons, pions, or the like collide is also discussed in a field of fine semiconductors such as memories or the like.

In view of these, if the FIT curve can be acquired in an experiment by simulating the cosmic rays falling on the natural world such as the heavy particles, the protons, the muons, the pions, or the like, the same effect can be obtained by applying the first to fifth embodiments to the SEB due to these cosmic rays.

Note that regarding the embodiments and modifications described above, it is planned from the beginning of filing the application to appropriately combine the configurations described in the embodiments within a range in which no inconvenience or contradiction arises, in addition to combinations without being mentioned in the description.

The embodiments disclosed herein should be considered to be exemplified in all respects and not restrictive. The technical scope indicated by the present disclosure is not indicated by the description of the embodiments described above but by the claims, and is intended to include meanings equivalent to the claims and all modifications within the scope.

REFERENCE SIGNS LIST

1, 1*a*, 1*b*: first semiconductor elements, 1*d*, 1*s*, 10*d*, 10*s*: diodes, 2: reactor, 3*p*, 9*p*: input positive buses, 3*n*, 9*n*: input negative buses, 5*p*: output positive bus, 5*n*: output negative bus, 6: first power semiconductor module, 7, 8, 13: smoothing capacitors, 10, 10*a* to 10*f*: second semiconductor elements, 10*m*: MOSFET, 11*u*, 11*v*, 11*w*: AC output terminals, 14: second power semiconductor module, 16: base plate, 17, 21: bonding materials, 18: back electrode, 19: insulating material, 20: front electrode, 23*a*: water-cooling device, 23*b*: cooling pipe, 24: thermocouple, 25: thermistor, 26: temperature sensor, 27: space, 28: atmosphere, 29: ground surface, 30: cosmic ray, 31: neutron, 32: accelerator, 33: DC power source, 35: voltage-dividing resistor, 36: leakage-measuring resistor, 38, 40 to 45, 51, 52: FIT curves, 39: high withstand-voltage semiconductor element, 46: height data, 47: latitude data, 48: longitude data, 49: neutron ratio, 50, 55: input voltages, 54, 56: FIT data, 61: GPS, 62: altimeter, 63: computer, 65: control unit, 67: thermometer, 70: CPU, 71: RAM, 72: ROM, 73: I/F device, 74: storage device, 75: communication bus, 1000: aircraft, 1001, 1001*a*, 1001*b*: propulsion system motor, 1002*a*, 1002*b*: electrical components, 1003: generator, 1004: AC/DC converter, 1005: battery, 1006, 1008, 1008*b*, 1008*c*, 1010: DC/DC converters, 1007, 1009: DC/AC converters, 2000: power source, 2001: propulsion system, 2002, 2002*b*, 2003, 2003*b*, 2004, 2004*b*: electrical component systems, 3001, 3001*b*, 3002: circuit breakers, 5000, 5000*b*, 5000*c*: non-insulated step-down chopper circuits, 5000*d*: non-insulated step-up chopper circuit, 5001, 5001*b*, 5001*c*: three-phase two-level inverter circuits, 10000: control device, TR1, TR2: output transformers.

The invention claimed is:

1. A power conversion device converting a DC power from a power source into a power to be supplied to a load, the power conversion device comprising:

a first power converter to be connected between the power source and the load;

at least one second power converter to be connected in parallel with the first power converter between the power source and the load; and a control circuitry to cause the first power converter and the at least one second power converter to perform parallel operation, wherein the control circuitry is configured to cause the at least one second power converter to operate alone when the first power converter fails, and during the parallel operation, the at least one second power converter has a failure rate attributable to neutrons lower than the first power converter.

2. The power conversion device according to claim 1, wherein the at least one second power converter includes a plurality of second power converters, and during the parallel operation, the plurality of second power converters have the failure rates that differ from each other.

3. The power conversion device according to claim 2, further comprising a third power converter to convert the DC power from the power source into a voltage, and supply the voltage to the first power converter and the at least one second power converter, wherein the first power converter and the at least one second power converter are configured to have the failure rates being equal in a case where input voltages are the same, and the third power converter converts a DC voltage of the power source into a first DC voltage to supply the first DC voltage to the first power converter, and converts the DC voltage into a second DC voltage lower than the first DC voltage to supply the second DC voltage to the at least one second power converter.

4. The power conversion device according to claim 2, wherein the first power converter includes a plurality of first semiconductor elements having first withstand voltages, and the at least one second power converter includes a plurality of second semiconductor elements having second withstand voltages higher than the first withstand voltages.

5. The power conversion device according to claim 2, wherein each of the first power converter and the at least one second power converter is configured to convert the DC power from the power source to a power to be supplied to the load by switching a plurality of arms, each of the plurality of arms of the first power converter includes N first semiconductor elements connected in parallel, each of the plurality of arms of the at least one second power converter has M second semiconductor elements connected in parallel, the first semiconductor elements and the second semiconductor elements are configured to have the failure rates being equal in a case where applied voltages are the same, and N is an integer of greater than or equal to 2, and M is an integer of greater than or equal to 1 and less than N.

6. The power conversion device according to claim 2, further comprising a third power converter to convert the DC power from the power source into a voltage, and supply the voltage to the first power converter and the at least one second power converter, wherein the third power converter has the failure rate lower than the first power converter and the at least one second power converter.

7. The power conversion device according to claim 6, wherein the first power converter, the at least one second power converter, and the third power converter are configured to have the failure rates being equal in a case where input voltages are the same, the third power converter converts the DC voltage of the power source into a first DC voltage to supply the first DC voltage to the first power converter, and converts the DC voltage into a second DC voltage lower than the first DC voltage to supply the second DC voltage to the at least one second power converter, and the power source supplies a third DC voltage lower than the second DC voltage to the third power converter.

8. The power conversion device according to claim 6, wherein the first power converter includes a plurality of first semiconductor elements having first withstand voltages, the at least one second power converter includes a plurality of second semiconductor elements having second withstand voltages higher than the first withstand voltages, and the third power converter includes a plurality of third semiconductor elements having third withstand voltages higher than the second withstand voltages.

9. The power conversion device according to claim 6, wherein the first power converter includes X first semiconductor elements, the at least one second power converter includes Y second semiconductor elements, the third power converter includes Z third semiconductor elements, the first semiconductor elements, the second semiconductor elements, and the third semiconductor elements are configured to have the failure rates being equal in a case where applied voltages are the same, and X is an integer of greater than or equal to 2, Y is an integer of greater than or equal to 2 and less than X, and Z is an integer of greater than or equal to 1 and less than Y.

10. The power conversion device according to claim 2, further comprising a third power converter to convert the DC power from the power source into a voltage, and supply the voltage to the first power converter and the at least one second power converter; and at least one fourth power converter to be connected in parallel with the third power converter between the power source, and a parallel circuit of the first power converter and the at least one second power converter, wherein the control circuitry is configured to cause the third power converter and the at least one fourth power converter to perform parallel operation, and to cause the at least one fourth power converter to operate alone when the third power converter fails, and the at least one fourth power converter has the failure rate lower than the third power converter.

11. The power conversion device according to claim 1, further comprising a third power converter to convert the DC power from the power source into a voltage, and supply the voltage to the first power converter and the at least one second power converter, wherein the first power converter and the at least one second power converter are configured to have the failure rates being equal in a case where input voltages are the same, and the third power converter converts a DC voltage of the power source into a first DC voltage to supply the first DC voltage to the first power converter, and converts the DC voltage into a second DC voltage lower than the first DC voltage to supply the second DC voltage to the at least one second power converter.

12. The power conversion device according to claim 1, wherein the first power converter includes a plurality of first semiconductor elements having first withstand voltages, and the at least one second power converter includes a plurality of second semiconductor elements having second withstand voltages higher than the first withstand voltages.

13. The power conversion device according to claim 1, wherein each of the first power converter and the at least one second power converter is configured to convert the DC power from the power source to a power to be supplied to the load by switching a plurality of arms, each of the plurality of arms of the first power converter includes N first semiconductor elements connected in parallel, each of the plurality of arms of the at least one second power converter has M second semiconductor elements connected in parallel, the first semiconductor elements and the second semiconductor elements are configured to have the failure rates being equal in a case where applied voltages are the same, and N is an integer of greater than or equal to 2, and M is an integer of greater than or equal to 1 and less than N.

14. The power conversion device according to claim 1, further comprising a third power converter to convert the DC power from the power source into a voltage, and supply the voltage to the first power converter and the at least one second power converter, wherein the third power converter has the failure rate lower than the first power converter and the at least one second power converter.

15. The power conversion device according to claim 14, wherein the first power converter, the at least one second power converter, and the third power converter are configured to have the failure rates being equal in a case where input voltages are the same, the third power converter converts the DC voltage of the power source into a first DC voltage to supply the first DC voltage to the first power converter, and converts the DC voltage into a second DC voltage lower than the first DC voltage to supply the second DC voltage to the at least one second power converter, and the power source supplies a third DC voltage lower than the second DC voltage to the third power converter.

16. The power conversion device according to claim 14, wherein the first power converter includes a plurality of first semiconductor elements having first withstand voltages, the at least one second power converter includes a plurality of second semiconductor elements having second withstand voltages higher than the first withstand voltages, and the third power converter includes a plurality of third semiconductor elements having third withstand voltages higher than the second withstand voltages.

17. The power conversion device according to claim 14, wherein the first power converter includes X first semiconductor elements, the at least one second power converter includes Y second semiconductor elements, the third power converter includes Z third semiconductor elements, the first semiconductor elements, the second semiconductor elements, and the third semiconductor elements are configured to have the failure rates being equal in a case where applied voltages are the same, and X is an integer of greater than or equal to 2, Y is an integer of greater than or equal to 2 and less than X, and Z is an integer of greater than or equal to 1 and less than Y.

18. The power conversion device according to claim 1, further comprising a third power converter to convert the DC power from the power source into a voltage, and supply the voltage to the first power converter and the at least one second power converter; and at least one fourth power converter to be connected in parallel with the third power converter between the power source, and a parallel circuit of the first power converter and the at least one second power converter, wherein the control circuitry is configured to cause the third power converter and the at least one fourth power converter to perform parallel operation, and to cause the at least one fourth power converter to operate alone when the third power converter fails, and the at least one fourth power converter has the failure rate lower than the third power converter.

19. An aircraft comprising:

the power source;

the power conversion device according to claim 1; and the load.

* * * * *